US012769851B2

(12) United States Patent
Vogt

(10) Patent No.: US 12,769,851 B2
(45) Date of Patent: Oct. 20, 2026

(54) PARALLEL PROCESSING SYSTEMS AND METHODS FOR FACILITATING BITSTREAM SECURITY

(71) Applicant: Lattice Semiconductor Corporation, Hillsboro, OR (US)

(72) Inventor: Tim Vogt, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 161 days.

(21) Appl. No.: 18/628,585

(22) Filed: Apr. 5, 2024

(65) Prior Publication Data

US 2025/0315536 A1 Oct. 9, 2025

(51) Int. Cl.
*G06F 21/60* (2013.01)
*G06F 21/54* (2013.01)
*G06F 21/64* (2013.01)

(52) U.S. Cl.
CPC ............ *G06F 21/602* (2013.01); *G06F 21/54* (2013.01); *G06F 21/64* (2013.01)

(58) Field of Classification Search
CPC ......... G06F 21/602; G06F 21/54; G06F 21/64
See application file for complete search history.

(56) References Cited

U.S. PATENT DOCUMENTS 9,208,293 B1 * 12/2015 Zhu ....................... H04W 4/029
9,218,505 B1 * 12/2015 Wesselkamper ........ G06F 21/72
9,577,822 B1 * 2/2017 Pedersen ................. G06F 21/30
12,470,379 B2 * 11/2025 Berzati ................. H04L 9/3239
2003/0105963 A1 6/2003 Slick et al.
2007/0198851 A1 * 8/2007 Goto ..................... G06F 12/145 713/168
2013/0138966 A1 * 5/2013 Tagashira .............. H04L 9/3242 713/179

(Continued)

OTHER PUBLICATIONS

Unterstein, F. et al., "SCA secure and updatable crypto engines for FPGA SoC bitstream decryption: extended version," Dec. 24, 2020, vol. 11, No. 3, Journal of Cryptographic Engineering.

*Primary Examiner* — Jeremiah L Avery
*Assistant Examiner* — Ethan V Vo
(74) *Attorney, Agent, or Firm* — Haynes and Boone, LLP

(57) ABSTRACT

Various techniques are provided to implement parallel processing systems and methods for facilitating bitstream security. In one example, a method includes receiving a bitstream, a signature associated with the bitstream, predetermined authentication data associated with the bitstream, and a public key associated with a provider of the bitstream. The method further includes verifying the signature based on the predetermined authentication data. The method further includes computing authentication data based on the bitstream and verifying the predetermined authentication data based on the computed authentication data. The method further includes determining an integrity associated with content of the bitstream. The method further includes performing a mitigation action when the signature verification result indicates an unsuccessful authentication, the authentication data verification result indicates an unsuccessful authentication, and/or an integrity result indicates a failed integrity check. Related systems and devices are provided.

20 Claims, 11 Drawing Sheets

(56) References Cited

U.S. PATENT DOCUMENTS

| | | | | |
|---|---|---|---|---|
| 2015/0121084 | A1* | 4/2015 | Kirrmann | H04L 9/3242<br>713/176 |
| 2015/0172298 | A1* | 6/2015 | Otsuka | H04L 63/123<br>726/30 |
| 2019/0034205 | A1* | 1/2019 | Golombek | G06F 21/64 |
| 2020/0167506 | A1* | 5/2020 | Iyer | G06F 21/76 |
| 2021/0192014 | A1* | 6/2021 | Yamaguchi | H04L 9/3247 |
| 2021/0377036 | A1* | 12/2021 | Such Vicente | G06F 21/64 |
| 2023/0119255 | A1* | 4/2023 | Soubhi | G06F 21/575<br>713/193 |
| 2023/0315913 | A1 | 10/2023 | Chandra et al. | |

* cited by examiner

PARALLEL PROCESSING SYSTEMS AND METHODS FOR FACILITATING BITSTREAM SECURITY

TECHNICAL FIELD

The present invention relates generally to bitstream security and, more particularly, to parallel processing systems and methods for facilitating bitstream security.

BACKGROUND

Programmable logic devices (PLDs) (e.g., field programmable gate arrays (FPGAs), complex programmable logic devices (CPLDs), field programmable systems on a chip (FPSCs), or other types of programmable devices) may be configured with various user designs to implement desired functionality. Typically, the user designs are synthesized and mapped into configurable resources, including by way of non-limiting example programmable logic gates, look-up tables (LUTs), embedded hardware, interconnections, and/or other types of resources, available in particular PLDs. Physical placement and routing for the synthesized and mapped user designs may then be determined to generate configuration data for the particular PLDs. The generated configuration data is loaded into configuration memory of the PLDs to implement the programmable logic gates, LUTs, embedded hardware, interconnections, and/or other types of configurable resources.

SUMMARY

In one embodiment, a method includes receiving, by a system, a bitstream, a signature associated with the bitstream, predetermined authentication data associated with the bitstream, and a public key associated with a provider of the bitstream. The method further includes verifying, by the system, the signature based on the predetermined authentication data to obtain a first verification result. The method further includes computing, by the system, authentication data based on the bitstream to obtain computed authentication data. The method further includes verifying, by the system, the predetermined authentication data based on the computed authentication data to obtain a second verification result. The method further includes determining, by the system, an integrity associated with content of the bitstream to obtain at least one integrity result. The method further includes performing, by the system, one or more mitigation actions when the first verification result indicates an unsuccessful authentication, the second verification result indicates an unsuccessful authentication, and/or the at least one integrity result indicates a failed integrity check.

In another embodiment, a system includes an authentication block including a signature verification block configured to verify a signature received by the system based on predetermined authentication data received by the system to obtain a first verification result. The signature and the predetermined authentication data are associated with a bitstream received by the system. The authentication block further includes an authentication data verification block configured to compute authentication data based on the bitstream to obtain computed authentication data and verify the predetermined authentication data based on the computed authentication data to obtain a second verification result. The system further includes an integrity block configured to determine an integrity associated with content of the bitstream to obtain at least one integrity result. The system further includes a control block configured to perform one or more mitigation actions when the first verification result indicates an unsuccessful authentication, the second verification result indicates an unsuccessful authentication, and/or the at least one integrity result indicates a failed integrity check.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
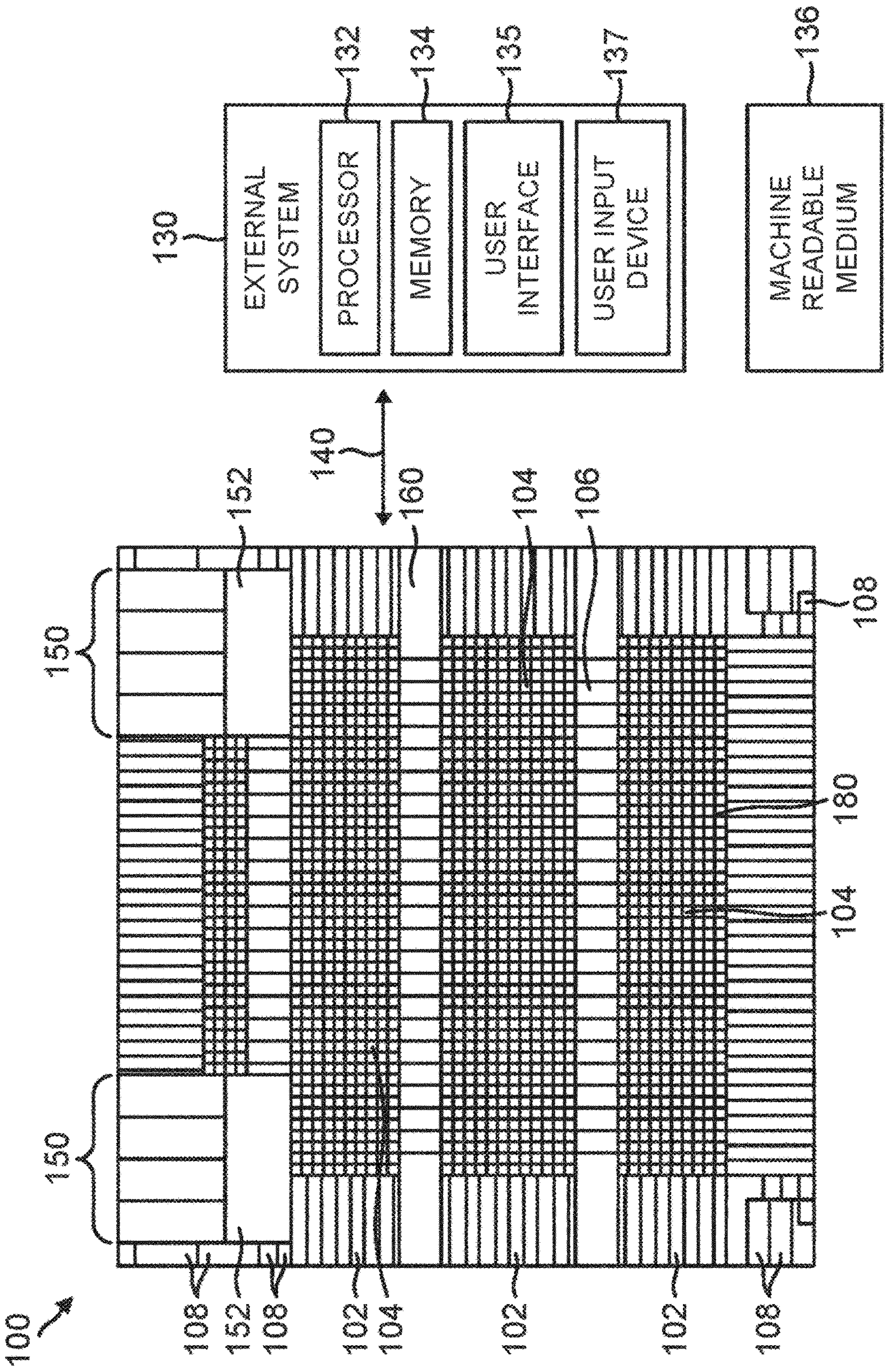
FIG. 1 illustrates a block diagram of a PLD in accordance with one or more embodiments of the present disclosure.

In accordance with embodiments disclosed herein, various techniques are provided to implement parallel processing for facilitating bitstream security. In some embodiments, a system may handle/process an authenticated and encrypted bitstream using a parallel and pipelined architecture. The system may perform, in parallel, decryption of an encrypted bitstream to obtain a decrypted bitstream (e.g., also referred to as a plaintext bitstream), verification of a signature associated with the encrypted bitstream, and verification of authentication data associated with the encrypted bitstream. In some embodiments, performing of the decryption, the signature verification, and the authentication data verification in parallel is referred to as parallel processing the bitstream. In some implementations, the decryption, signature verification, and authentication data verification may be initiated at substantially the same time. In some aspects, once at least a portion of the encrypted bitstream is decrypted, an integrity of the decrypted bitstream (or portion thereof) may be determined in parallel with any processes not yet completed (e.g., any portion of the decryption, signature verification, and/or authentication data verification not yet completed). In some implementations, the encrypted bitstream may include encrypted data blocks. The system may decrypt each encrypted data block to obtain a respective decrypted/plaintext data block and perform an integrity check on each decrypted data block.

A system according to one or more embodiments may alternatively or in addition handle/process bitstreams that are authenticated but not encrypted using the parallel and pipelined architecture. In an aspect, such bitstreams may be referred to as authenticated-only bitstreams. Such bitstreams include plaintext data. In some implementations, the bitstreams include plaintext data blocks. For such bitstreams, the system may perform, in parallel, determining an integrity of a bitstream (e.g., starting with an integrity check of a first plaintext data block of the bitstream), verification of a signature associated with the bitstream, and verification of authentication data associated with the bitstream. In some embodiments, performing of the integrity determination, the signature verification, and the authentication data verification in parallel is referred to as parallel processing the bitstream. In some implementations, the integrity detection, signature verification, and authentication data verification may be initiated at substantially the same time. In some embodiments, the system may generally be able to handle secure bitstreams, in which secure bitstreams may encompass authenticated and encrypted bitstreams as well as authenticated-only bitstreams.

In some embodiments, for a given bitstream, the bitstream may be considered successfully authenticated if both a verification result of the signature verification and a verification result of the authentication data verification indicate a pass. In some embodiments, the system may abort a process for handling the bitstream in response to a failed signature verification, a failed authentication data verification, or a failed integrity check, whichever occurs first. In an aspect, a fail state or a fail event may refer to any one of a failed signature verification, a failed authentication data verification, or a failed integrity check. In this regard, any ongoing operations of the system in relation to handling the bitstream that may be occurring in parallel at a time a signature verification is determined to have been failed, an authentication data verification is determined to have been failed, or an integrity check is determined to have been failed may be aborted.

In some embodiments, a bitstream may include a configuration bitstream containing configuration data for configuring/programming a PLD (e.g., an FPGA). The PLD may be configured/programmed as each plaintext data block passes its integrity check. If a fail event occurs when handling the bitstream (e.g., a failed signature verification, a failed authentication data verification, or a failed integrity check), the system may cause a shutdown of the PLD. The shutdown may clear any system parameters populated by processing the bitstream thus far, clear memory of the PLD, clear any keys in temporary storage, and so forth and/or reset various values to typical, stored, and/or learned values to be used next time the system initiates a process for handling a bitstream. If the bitstream is successfully authenticated and all integrity checks pass, the PLD may proceed to operate according to the configuration data.

A given bitstream (e.g., encrypted or non-encrypted) may be stored in a storage device. The storage device may include a random access memory device, an external system on a chip (SoC), an external streaming source, and/or generally any system that may be used to store data to be accessed (e.g., read) and/or otherwise provided to a system for processing according to the parallel and pipelined architecture in accordance with various embodiments. In this regard, the system according to various embodiments may read or otherwise access the bitstream from the storage device (e.g., a static memory device such as a random access memory device) or receive the bitstream via a streaming interface(s) of the system (e.g., the storage device for the bitstream is an external streaming source).

To facilitate parallel processing of a bitstream (e.g., encrypted or plaintext bitstream), a storage device may store predetermined authentication data in addition to the bitstream. A system (e.g., a transmitter-side system and also referred to as an encryption-side system for encrypted bitstreams) that generated the bitstream also generates the predetermined authentication data based on the bitstream and stores the bitstream and the predetermined authentication data, among other data, in the storage device. As non-limiting examples, authentication data may be, or may include, a message digest and/or a tag. With the predetermined authentication data, the system may initiate signature verification based on the predetermined authentication data in parallel with decrypting and/or integrity checking a portion of the bitstream. As additional security, the predetermined authentication data may be verified based on corresponding authentication data computed by the system based on the bitstream. In this regard, the predetermined authentication data may allow authentication to start promptly and, in some cases, before all of the data content (e.g., the bitstream) has been received.

By implementing processing of authentication and decryption (if applicable) and/or integrity check operations in parallel using various embodiments, processing time of a bitstream may be reduced relative to serialized techniques in which authentication data is first computed, then a signature verified, and then decryption (if bitstream is encrypted) and integrity checks can occur. In some aspects, parallel processing according to various embodiments may allow data content (e.g., the bitstream) to be read only once or received only once (e.g., if the bitstream is from a streaming source), in contrast to serialized techniques in which at least two reads/receipts of the entire data content are performed (e.g., one read/receipt of the entire data content to authenticate the data content and another read/receipt to decrypt the data content).

When the bitstreams are configuration bitstreams, parallel processing of the configuration bitstreams in accordance with various embodiments may allow PLD boot time (e.g., FPGA boot time) for secure bitstreams (e.g., authenticated-only bitstreams, authenticated and encrypted bitstreams) to be similar to or the same as PLD boot time for non-secure bitstreams (e.g., bitstreams that are not authenticated and not encrypted). This similar or same PLD boot time for secure bitstreams and non-secure bitstreams is in contrast to serialized techniques in which a relative PLD boot time of secure compared to non-secure bitstreams would be apparent (e.g., with the boot time of secure bitstreams noticeably higher).

Furthermore, various embodiments may mitigate a threat of data modification related to side channel attacks through performing of integrity checks on decrypted data. Side-channel attacks may refer to attacks by an adversary/attacker that do not directly involve an attempt at recovering or accessing the attacked device's data, but instead rely on collecting information leakages and determining the data based on the collected information leakages. In some cases, in a side-channel attack, an attacker may be attempting to recover data content (e.g., device secret) based on monitoring a power profile (e.g., electromagnetic emissions) of a device receiving and performing operations associated with the data content when the device is performing the operations. For example, an attacker may attempt to determine decryption keys by modifying/tampering with encrypted data being provided to a decrypting device that utilizes the decryption keys for decryption and monitor a power profile when decryption of the modified/tampered encrypted data is occurring. In this example, the data content the attacker may be attempting to recover include at least the decryption keys.

Using various embodiments, modification/tampering of encrypted data content may be quickly detected by performing integrity checks as data is decrypted and any ongoing operations halted in response to a detected content-based modification/tampering. In an aspect, the integrity checks may be considered as being embedded in decrypted data and may be referred to as embedded integrity checks. By way of non-limiting examples, integrity checks may be implemented as and/or based on syntax checks for legal data syntax, parity checks, cyclic redundancy checks, cryptographic hashes, error correction codes, and/or generally any integrity checking function(s). In an aspect, an integrity check may be performed on decrypted data to detect any content-based tampering of the corresponding encrypted data. For bitstreams that are not encrypted, such integrity checks may be performed to detect if the data was corrupted during transmission. Due to the parallel and pipelined architecture, the embedded integrity checks may allow side-channel attacks to be detected without requiring that the entire data content be authenticated first, thus reducing processing time as well as improving security. In some embodiments, determining an integrity on a block-by-block basis by performing embedded integrity checks may allow early detection of data tampering relative to techniques in which the entire encrypted bitstream is decrypted and a single integrity check performed on the entire decrypted bitstream.

Further in this regard, due to the parallel and pipelined architecture, the system may be suitable for use (e.g., meets processing time and security specifications) with streaming interfaces, such as SSPI (e.g., serial peripheral interface designated as subordinate, secondary, or target (e.g., controlled by a primary)), in addition to use with random access storage devices, such as flash memory. In addition to longer processing time, multiple reads or multiple instances of streaming (e.g., by a streaming source) of an entire data content associated with serialized techniques may also be associated with lower security. In this regard, when serialized techniques are used, after the data content is successfully authenticated and before decryption begins, the data content may have been modified/tampered or otherwise different data content may be provided. For example, after an initial data content is authenticated successfully, the streaming source or attacker may provide different data content for decryption. As such, when using serialized techniques, an insecure avenue/situation is provided in which authentication and decryption may be based on different data content and thus security is not guaranteed. As provided above, due to the parallel and pipelined architecture according to various embodiments, the embedded integrity checks may allow side-channel attacks to be detected without requiring that the entire data content be authenticated first, thus reducing processing time as well as improving security.

Referring now to the figures, FIG. 1 illustrates a block diagram of a PLD 100 in accordance with one or more embodiments of the present disclosure. In various embodiments, the PLD 100 may be implemented as a standalone device, for example, or may be embedded in a die that contains a system on a chip (SoC), other logic devices, and/or other integrated circuit(s). The PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)). In some cases, the PLD 100 may generally be any type of programmable device (e.g., programmable integrated circuit) with distributed configuration, which may involve loading configuration data through pins, shifting to appropriate locations in associated fabric, and configuring configuration memory cells. The PLBs may also be referred to as logic blocks, programmable functional units (PFUs), or programmable logic cells (PLCs). In an aspect, the PLBs 104 may collectively form an integrated circuit (IC) core or logic core of the PLD 100. The I/O blocks 102 provide I/O functionality (e.g., to support one or more I/O and/or memory interface standards) for the PLD 100, while the PLBs 104 provide logic functionality (e.g., LUT-based logic) for the PLD 100. Additional I/O functionality may be provided by serializer/deserializer (SERDES) blocks 150 and physical coding sublayer (PCS) blocks 152. The PLD 100 may also include hard intellectual property core (IP) blocks 160 to provide additional functionality (e.g., substantially predetermined functionality provided in hardware which may be configured with less programming than the PLBs 104).

The PLD 100 may include blocks of memory 106 (e.g., blocks of erasable programmable read-only memory (EEPROM), block static RAM (SRAM), and/or flash memory), clock-related circuitry 108 (e.g., clock sources, phase-locked loop (PLL) circuits, delay-locked loop (DLL) circuits, and/or feedline interconnects), and/or various routing resources 180 (e.g., interconnect and appropriate switching circuits to provide paths for routing signals throughout the PLD 100, such as for clock signals, data signals, control signals, or others) as appropriate. In general, the various elements of the PLD 100 may be used to perform their intended functions for desired applications, as would be understood by one skilled in the art.

For example, certain of the I/O blocks 102 may be used for programming the memory 106 or transferring information (e.g., various types of user data and/or control signals) to/from the PLD 100. Other of the I/O blocks 102 include a first programming port (which may represent a central processing unit (CPU) port, a peripheral data port, a serial peripheral interface (SPI) interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). In various embodiments, the I/O blocks 102 may be included to receive configuration data and commands (e.g., over one or more connections) to configure the PLD 100 for its intended use and to support serial or parallel device configuration and information transfer with the SERDES blocks 150, PCS blocks 152, hard IP blocks 160, and/or PLBs 104 as appropriate. In another example, the routing resources 180 may be used to route connections between components, such as between I/O nodes of logic blocks 104. In some embodiments, such routing resources may include programmable elements (e.g., nodes where multiple routing resources intersect) that may be used to selectively form a signal path for a particular connection between components of the PLD 100.

It should be understood that the number and placement of the various elements are not limiting and may depend upon the desired application. For example, various elements may not be required for a desired application or design specification (e.g., for the type of programmable device selected). Furthermore, it should be understood that the elements are illustrated in block form for clarity and that various elements would typically be distributed throughout the PLD 100, such as in and between the PLBs 104, hard IP blocks 160, and routing resources 180 to perform their conventional functions (e.g., storing configuration data that configures the PLD 100 or providing interconnect structure within the PLD 100). For example, the routing resources 180 may be used for internal connections within each PLB 104 and/or between different PLBs 104. It should also be understood that the various embodiments disclosed herein are not limited to programmable logic devices, such as the PLD 100, and may be applied to various other types of programmable devices, as would be understood by one skilled in the art.

An external system 130 may be used to create a desired user configuration or design of the PLD 100 and generate corresponding configuration data to program (e.g., configure) the PLD 100. For example, to configure the PLD 100, the system 130 may provide such configuration data to one or more of the I/O blocks 102, PLBs 104, SERDES blocks 150, and/or other portions of the PLD 100. In this regard, the external system 130 may include a link 140 that connects to a programming port (e.g., SPI, JTAG) of the PLD 100 to facilitate transfer of the configuration data from the external system 130 to the PLD 100. As a result, the I/O blocks 102, PLBs 104, various of the routing resources 180, and any other appropriate components of the PLD 100 may be configured to operate in accordance with user-specified applications.

In the illustrated embodiment, the system 130 is implemented as a computer system. In this regard, the system 130 includes, for example, one or more processors 132 that may be configured to execute instructions, such as software instructions, provided in one or more memories 134 and/or stored in non-transitory form in one or more non-transitory machine readable media 136 (e.g., which may be internal or external to the system 130). For example, in some embodiments, the system 130 may run PLD configuration software, such as Lattice Radiant software available from Lattice Semiconductor Corporation to permit a user to create a desired configuration and generate corresponding configuration data to program the PLD 100. In this regard, in some cases, the system 130 and/or other external/remote system may be used for factory programming or remote programming (e.g., remote updating) of one or more PLDs (e.g., through a network), such as the PLD 100.

The configuration data may alternatively or in addition be stored on the PLD 100 (e.g., stored in a memory located within the PLD 100) and/or a separate/discrete memory of a system including the PLD 100 and the separate/discrete memory (e.g., a system within which the PLD 100 is operating). In some embodiments, the memory 106 of the PLD 100 may include non-volatile memory (e.g., flash memory) utilized to store the configuration data generated and provided to the memory 106 by the external system 130. During configuration of the PLD 100, the non-volatile memory may provide the configuration data via configuration paths and associated data lines to configure the various portions (e.g., I/O blocks 102, PLBs 104, SERDES blocks 150, routing resources 180, and/or other portions) of the PLD 100. In some cases, the configuration data may be stored in non-volatile memory external to the PLD 100 (e.g., on an external hard drive such as the memories 134 in the system 130). During configuration, the configuration data may be provided (e.g., loaded) from the external non-volatile memory into the PLD 100 to configure the PLD 100.

The system 130 also includes, for example, a user interface 135 (e.g., a screen or display) to display information to a user, and one or more user input devices 137 (e.g., a keyboard, mouse, trackball, touchscreen, and/or other device) to receive user commands or design entry to prepare a desired configuration of the PLD 100. In some embodiments, user interface 135 may be adapted to display a netlist, a component placement, a connection routing, hardware description language (HDL) code, and/or other final and/or intermediary representations of a desired circuit design, for example.

Figure 2:
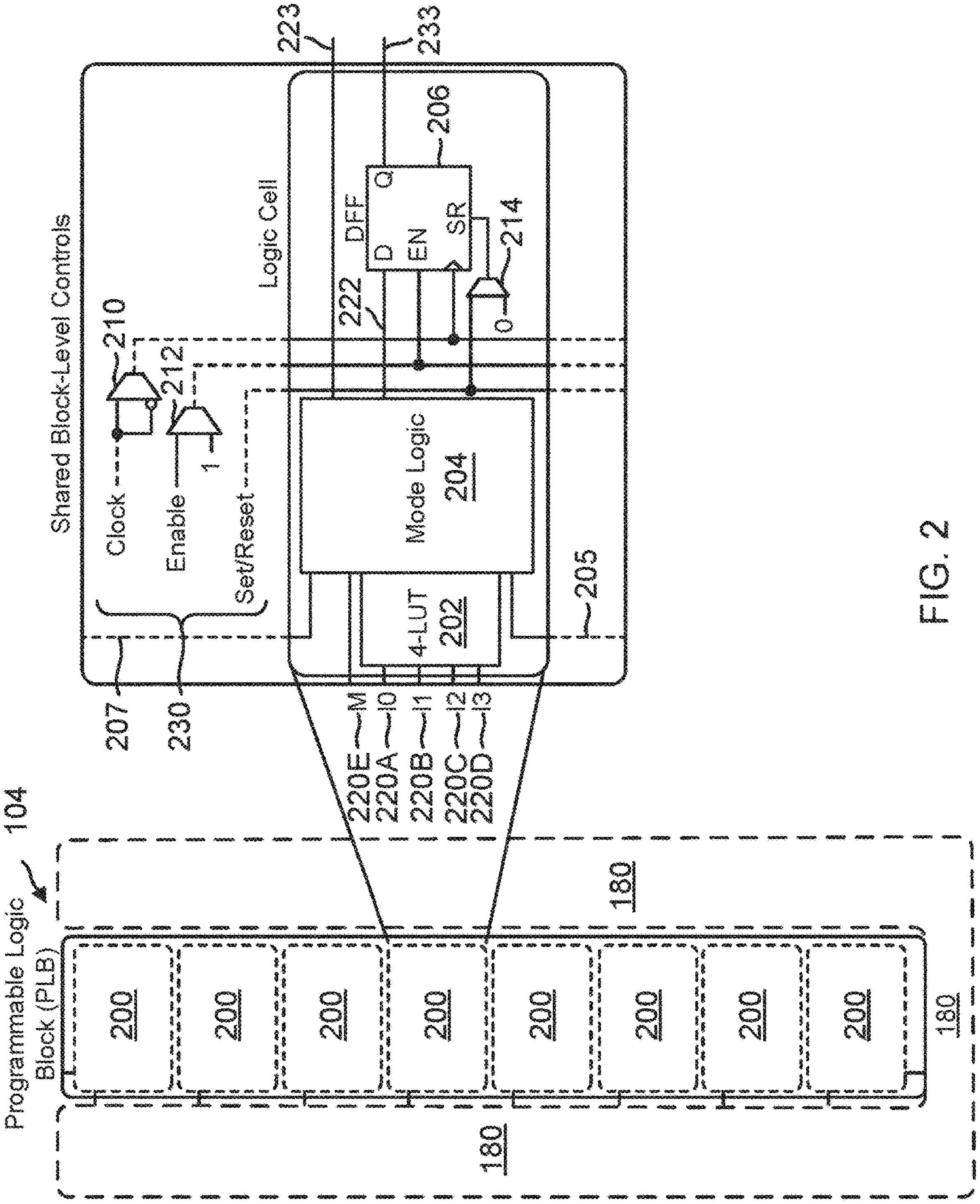
FIG. 2 illustrates a block diagram of a programmable logic block of a PLD in accordance with one or more embodiments of the present disclosure.

FIG. 2 illustrates a block diagram of a logic block 104 of the PLD 100 in accordance with one or more embodiments of the present disclosure. As discussed, the PLD 100 includes a plurality of logic blocks 104 including various components to provide logic and arithmetic functionality. In the example embodiment shown in FIG. 2, the logic block 104 includes a plurality of logic cells 200, which may be interconnected internally within logic block 104 and/or externally using the routing resources 180. For example, each logic cell 200 may include various components such as: a lookup table (LUT) 202, a mode logic circuit 204, a register 206 (e.g., a flip-flop or latch), and various programmable multiplexers (e.g., programmable multiplexers 212 and 214) for selecting desired signal paths for the logic cell 200 and/or between logic cells 200. In this example, the LUT 202 accepts four inputs 220A-220D, which makes it a four-input LUT (which may be abbreviated as "4-LUT" or "LUT4") that can be programmed by configuration data for the PLD 100 to implement any appropriate logic operation having four inputs or less. The mode logic 204 may include various logic elements and/or additional inputs, such as an input 220E, to support the functionality of various modes for the logic cell 200 (e.g., including various processing and/or functionality modes). The LUT 202 in other examples may be of any other suitable size having any other suitable number of inputs for a particular implementation of a PLD. In some embodiments, different size LUTs may be provided for different logic blocks 104 and/or different logic cells 200.

An output signal 222 from the LUT 202 and/or the mode logic 204 may in some embodiments be passed through the register 206 to provide an output signal 233 of the logic cell 200. In various embodiments, an output signal 223 from the LUT 202 and/or the mode logic 204 may be passed to the output 223 directly, as shown. Depending on the configuration of multiplexers 210-214 and/or the mode logic 204, the output signal 222 may be temporarily stored (e.g., latched) in the register 206 according to control signals 230. In some embodiments, configuration data for the PLD 100 may configure the output 223 and/or 233 of the logic cell 200 to be provided as one or more inputs of another logic cell 200 (e.g., in another logic block or the same logic block) in a staged or cascaded arrangement (e.g., comprising multiple levels) to configure logic and/or other operations that cannot be implemented in a single logic cell 200 (e.g., operations that have too many inputs to be implemented by a single LUT 202). Moreover, logic cells 200 may be implemented with multiple outputs and/or interconnections to facilitate selectable modes of operation.

The mode logic circuit 204 may be utilized for some configurations of the PLD 100 to efficiently implement arithmetic operations such as adders, subtractors, comparators, counters, or other operations, to efficiently form some extended logic operations (e.g., higher order LUTs, working on multiple bit data), to efficiently implement a relatively small RAM, and/or to allow for selection between logic, arithmetic, extended logic, and/or other selectable modes of operation. In this regard, the mode logic circuits 204, across multiple logic cells 200, may be chained together to pass carry-in signals 205 and carry-out signals 207, and/or other signals (e.g., output signals 222) between adjacent logic cells 200. In the example of FIG. 2, the carry-in signal 205 may be passed directly to the mode logic circuit 204, for example, or may be passed to the mode logic circuit 204 by configuring one or more programmable multiplexers. In some cases, the mode logic circuits 204 may be chained across multiple logic blocks 104.

The logic cell 200 illustrated in FIG. 2 is merely an example, and logic cells 200 according to different embodiments may include different combinations and arrangements of PLD components. Also, although FIG. 2 illustrates a logic block 104 having eight logic cells 200, a logic block 104 according to other embodiments may include fewer logic cells 200 or more logic cells 200. Each of the logic cells 200 of a logic block 104 may be used to implement a portion of a user design implemented by the PLD 100. In this regard, the PLD 100 may include many logic blocks 104, each of which may include logic cells 200 and/or other components which are used to collectively implement the user design.

Figure 3:
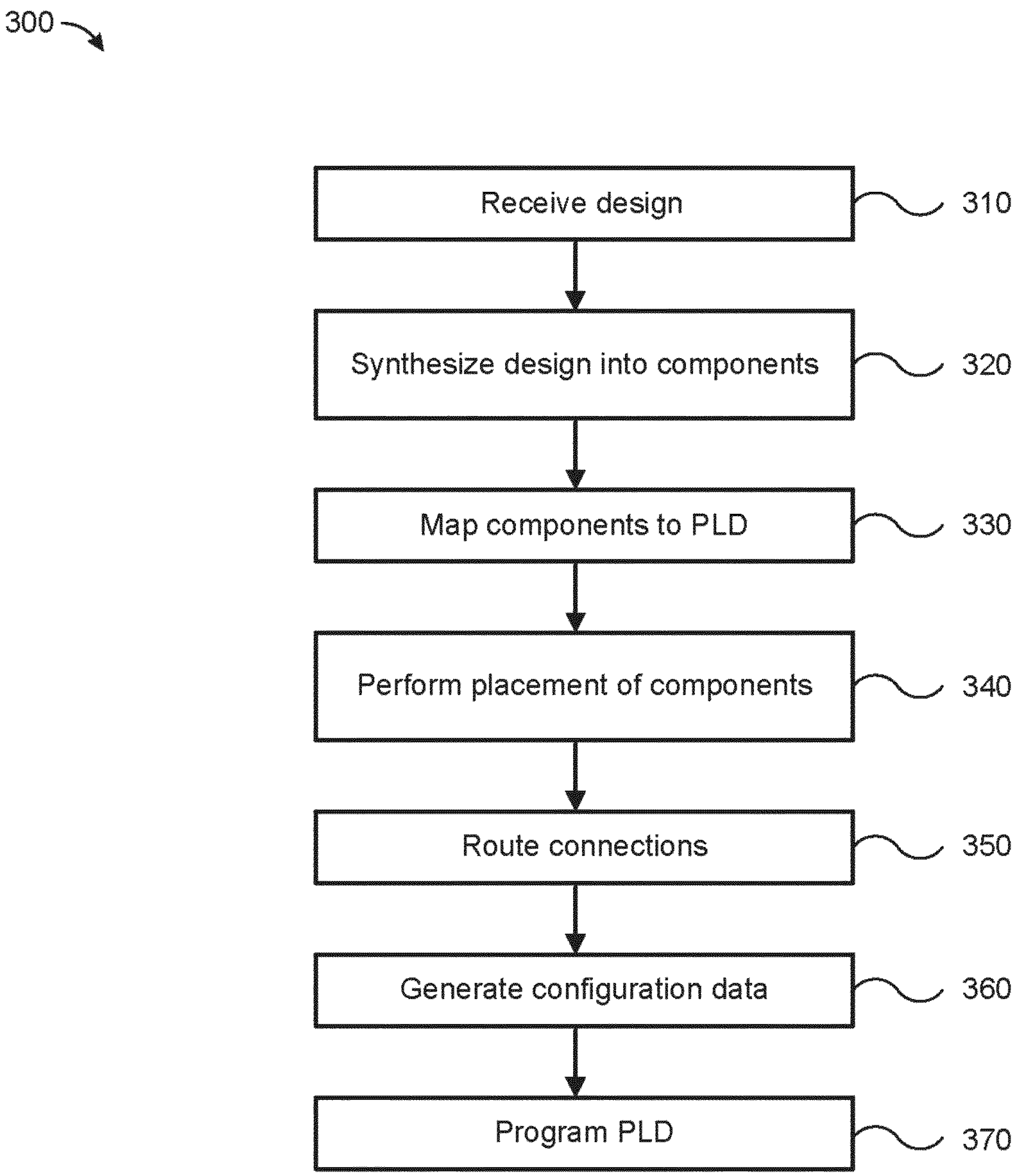
FIG. 3 illustrates a design process for a PLD in accordance with one or more embodiments of the present disclosure.

FIG. 3 illustrates a design process 300 for a PLD in accordance with one or more embodiments of the present disclosure. For example, the process of FIG. 3 may be performed by system 130 running Lattice Radiant software to configure the PLD 100. In some embodiments, the various files and information referenced in FIG. 3 may be stored, for example, in one or more databases and/or other data structures in the memory 134, the machine readable medium 136, and/or other storage.

In operation 310, the system 130 receives a user design that specifies the desired functionality of the PLD 100. For example, the user may interact with the system 130 (e.g., through the user input device 137 and HDL code representing the design) to identify various features of the user design (e.g., high level logic operations, hardware configurations, I/O and/or SERDES operations, and/or other features). In some embodiments, the user design may be provided in a register transfer level (RTL) description (e.g., a gate level description). The system 130 may perform one or more rule checks to confirm that the user design describes a valid configuration of PLD 100. For example, the system 130 may reject invalid configurations and/or request the user to provide new design information as appropriate. In an embodiment, each logic instance (e.g., implemented on a PLD) may receive a respective user design.

In operation 320, the system 130 synthesizes the design to create a netlist (e.g., a synthesized RTL description) identifying an abstract logic implementation of the user design as a plurality of logic components (e.g., also referred to as netlist components). In some embodiments, the netlist may be stored in Electronic Design Interchange Format (EDIF) in a Native Generic Database (NGD) file.

In some embodiments, synthesizing the design into a netlist in operation 320 may involve converting (e.g., translating) the high-level description of logic operations, hardware configurations, and/or other features in the user design into a set of PLD components (e.g., logic blocks 104, logic cells 200, and other components of the PLD 100 configured for logic, arithmetic, or other hardware functions to implement the user design) and their associated interconnections or signals. Depending on embodiments, the converted user design may be represented as a netlist.

In some embodiments, synthesizing the design into a netlist in operation 320 may further involve performing an optimization process on the user design (e.g., the user design converted/translated into a set of PLD components and their associated interconnections or signals) to reduce propagation delays, consumption of PLD resources and routing resources, and/or otherwise optimize the performance of the PLD when configured to implement the user design. Depending on embodiments, the optimization process may be performed on a netlist representing the converted/translated user design. Depending on embodiments, the optimization process may represent the optimized user design in a netlist (e.g., to produce an optimized netlist).

In some embodiments, the optimization process may include optimizing routing connections identified in a user design. For example, the optimization process may include detecting connections with timing errors in the user design, and interchanging and/or adjusting PLD resources implementing the invalid connections and/or other connections to reduce the number of PLD components and/or routing resources used to implement the connections and/or to reduce the propagation delay associated with the connections. In some cases, wiring distances may be determined based on timing.

In operation 330, the system 130 performs a mapping process that identifies components of the PLD 100 that may be used to implement the user design. In this regard, the system 130 may map the optimized netlist (e.g., stored in operation 320 as a result of the optimization process) to various types of components provided by the PLD 100 (e.g., logic blocks 104, logic cells 200, embedded hardware, and/or other portions of the PLD 100) and their associated signals (e.g., in a logical fashion, but without yet specifying placement or routing). In some embodiments, the mapping may be performed on one or more previously-stored NGD files, with the mapping results stored as a physical design file (e.g., also referred to as an NCD file). In some embodiments, the mapping process may be performed as part of the synthesis process in operation 320 to produce a netlist that is mapped to PLD components.

In operation 340, the system 130 performs a placement process to assign the mapped netlist components to particular physical components residing at specific physical locations of the PLD 100 (e.g., assigned to particular logic cells 200, logic blocks 104, clock-related circuitry 108, routing resources 180, and/or other physical components of PLD 100), and thus determine a layout for the PLD 100. In some embodiments, the placement may be performed in memory on data retrieved from one or more previously-stored NCD files, for example, and/or on one or more previously-stored NCD files, with the placement results stored (e.g., in the memory 134 and/or the machine readable medium 136) as another physical design file.

In operation 350, the system 130 performs a routing process to route connections (e.g., using the routing resources 180) among the components of the PLD 100 based on the placement layout determined in operation 340 to realize the physical interconnections among the placed components. In some embodiments, the routing may be performed in memory on data retrieved from one or more previously-stored NCD files, for example, and/or on one or more previously-stored NCD files, with the routing results stored (e.g., in the memory 134 and/or the machine readable medium 136) as another physical design file.

In various embodiments, routing the connections in operation 350 may further involve performing an optimization process on the user design to reduce propagation delays, consumption of PLD resources and/or routing resources, and/or otherwise optimize the performance of the PLD when configured to implement the user design. The optimization process may in some embodiments be performed on a physical design file representing the converted/translated user design, and the optimization process may represent the optimized user design in the physical design file (e.g., to produce an optimized physical design file).

Changes in the routing may be propagated back to prior operations, such as synthesis, mapping, and/or placement, to further optimize various aspects of the user design.

Thus, following operation 350, one or more physical design files may be provided which specify the user design after it has been synthesized (e.g., converted and optimized), mapped, placed, and routed (e.g., further optimized) for the PLD 100 (e.g., by combining the results of the corresponding previous operations). In operation 360, the system 130 generates configuration data for the synthesized, mapped, placed, and routed user design. In various embodiments, such configuration data may be encrypted and/or otherwise secured as part of such generation process. In operation 370, the system 130 configures/programs the PLD 100 with the configuration data (e.g., a configuration) into the PLD 100 over the connection 140. Such configuration may be provided in an encrypted, signed, or unsecured/unauthenticated form dependent on application/requirements.

Figure 4:
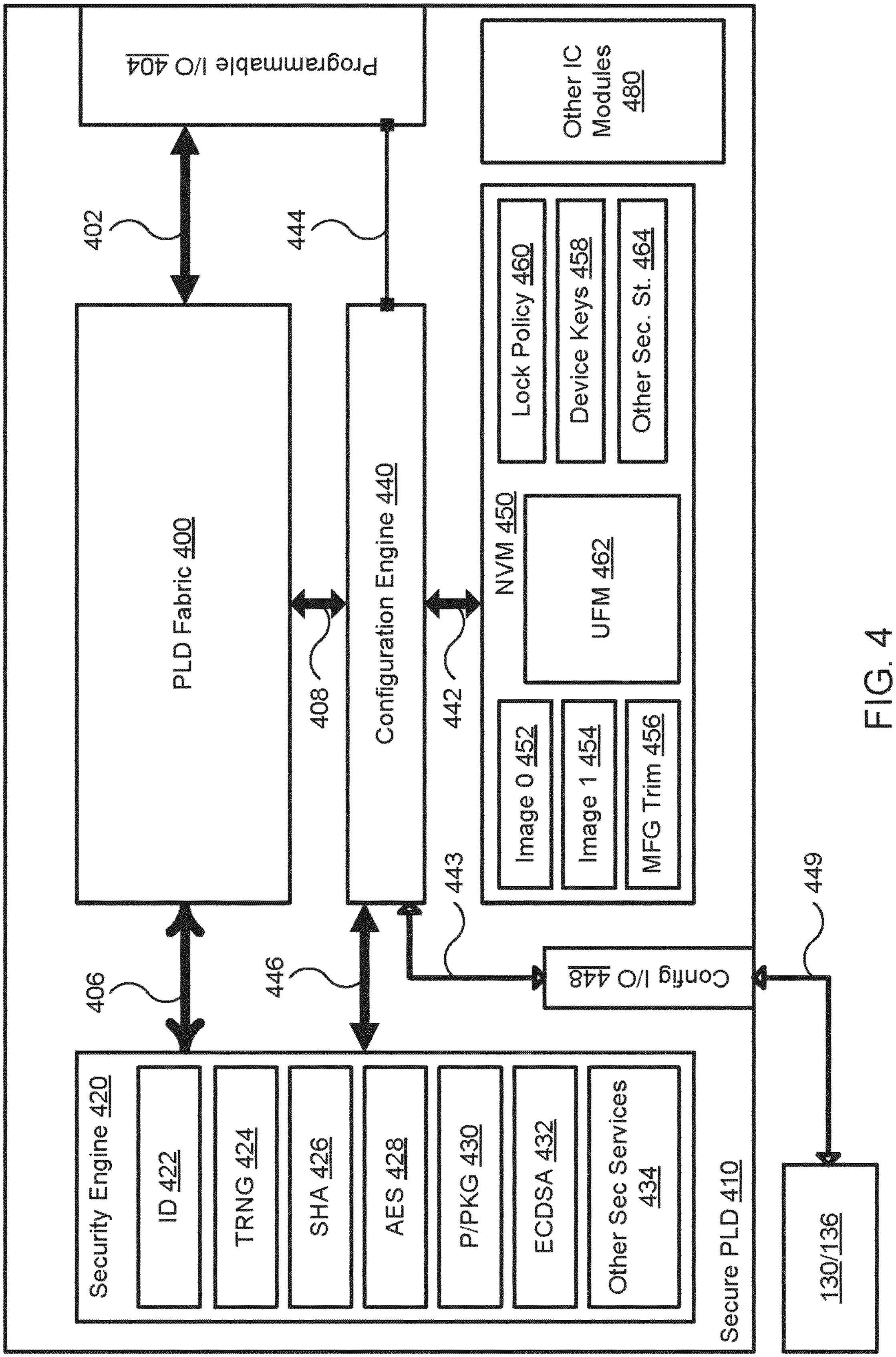
FIG. 4 illustrates a block diagram of a secure PLD in accordance with one or more embodiments of the present disclosure.

FIG. 4 illustrates a block diagram of a secure PLD 410 in accordance with one or more embodiments of the present disclosure. In various embodiments, the secure PLD 410 may be implemented by elements similar to those described with respect to the PLD 100 of FIG. 1, but with additional configurable and/or hard IP elements configured to facilitate operation of the secure PLD 410 in a trusted computing application and/or architecture. In particular, the secure PLD 410 may include a PLD fabric 400 linked by various buses to a security engine 420, a configuration engine 440, a non-volatile memory (NVM) 450, a programmable I/O 404, and/or other IC modules 480. In general, the PLD fabric 400 may be implemented by any of the various elements described with respect to the PLD 100 and may be configured using a design process similar to the process 300 described in relation to FIG. 3 to generate and program the PLD fabric 400 according to a desired configuration. More specifically, the secure PLD 410 may be configured to use various identified hard IP elements identified in FIG. 4 to receive, decrypt, authenticate, and/or verify a received configuration prior to programming the PLD fabric 400 according to the received configuration.

The security engine 420 may be at least partially implemented as a hard IP resource configured to provide various security functions for use by the PLD fabric 400 and/or configuration engine 440. In the embodiment shown in FIG. 4, the security engine 420 includes a device ID 422 (e.g., a 64-bit unique and device specific ID), a true random number generator (TRNG) 424, a secure hash algorithm (SHA) service 426 (e.g., an SHA-256/384, SHA-2, and/or SHA-3 service), an advanced encryption standard (AES) service 428 (e.g., an AES 256/128 encrypt/decrypt service), a public/private key pair generator (P/PKG) 430, an elliptic curve digital signature algorithm (ECDSA) authentication service 432 (e.g., an ECDSA256 or ECDSA384 service), and/or other security services 434.

The security engine 420 may be communicatively linked to the PLC fabric 400 over a limited bus 406 and to the configuration engine 440 over a secure bus 446. In general, the limited bus 406 may be configured to allow the PLD fabric 400 to access a limited set of security functions hosted by the security engine 420 and/or to access such security functions in a limited manner, such as disallowing access to a private key of a public/private key pair generated by the P/PKG 430. By contrast, the secure bus 446 may be configured to allow the configuration engine 440 to access and/or modify all security functions, data, and/or configurations of the security engine 420. In general, either or both the limited bus 406 and secure bus 446 may be configured to provide encrypted and/or otherwise secured communication between the security engine 420 and other elements of the secure PLD 410.

The configuration engine 440 may be at least partially implemented as a hard IP resource configured to manage the configurations of and/or communications amongst the various elements of the secure PLD 410. For example, the configuration engine 440 may be configured to receive an encrypted/secured configuration of the PLD fabric 400 from the external system 130/machine readable medium 136 over a configuration I/O 448, use security functions of the security engine 420 to authenticate and/or decrypt such configuration, store the authenticated and/or decrypted configuration in the NVM 450, soft or hard lock the portions of the NVM 450 corresponding to the stored configuration, tag the stored configuration as authenticated and/or verified bootable, and/or program the PLD fabric 400 according to the authenticated, decrypted, verified, and/or locked configuration, as described herein. In further embodiments, the configuration engine 440 may be configured to configure at least a portion of the programmable I/O 404 (e.g., to enable and/or disable at least portions of the programmable I/O 404) over the configuration port 444, as shown.

More generally, the configuration engine 440 may be configured to manage or control configurations of elements of the secure PLD 410, lock statuses of elements of the secure PLD 410, boot of the PLD fabric 400, and flow control throughout the secure PLD 410. For example, the configuration engine 440 may be configured to soft lock or unlock or hard lock any one or portion of buses 408, 442, 443, 446, for example, and/or to soft lock or unlock or hard lock any portion of sector of NVM 450. In a default unlocked configuration, buses 408, 442, and 446 may be implemented as secure buses similar in function to the secure bus 446. An external access bus 443 to the configuration I/O 448 may be implemented according to one or more of a JTAG, I2C, SPI, and/or other external access bus or protocol, for example, configured to provide lockable/unlockable access to and/or from the external system 130/machine readable medium 136. In a particular embodiment, the secure bus 408 may be implemented according to a wishbone bus/interface.

The NVM 450 may be implemented as a hard IP resource configured to provide securable non-volatile storage of data used to facilitate secure operation of the secure PLD 410. For example, the NVM 450 may include a lock policy 460 corresponding to memory locations in the NVM 450 indicating a lock status of data stored in the NVM 450. The contents of the lock policy 460 may be transferred to shadow registers within the configuration engine 440 upon power on of the secure PLD 410, for example, to allow such contents to be modified dynamically by the configuration engine 440 and/or the PLD fabric 400, depending on settings/lock statuses in the lock policy 460. In general, the lock status of a particular resource indicates read, write/program, and/or erase access for that resource, as against the PLD fabric 400, configuration I/O 448/external access bus 443, and/or other elements of the secure PLD 410.

As described herein, "soft" lock refers to a read, write, and/or erase access status of a bus/port or memory location in the NVM 450 that can be programmatically enabled or disabled by the PLD fabric 400 and/or across an external access bus 443 to granularly allow or disallow read, write, and/or erase access to the corresponding resource. "Hard" lock refers to a read, write, and/or erase access status of a bus/port or memory location in the NVM 450 that can be programmatically enabled across the external access bus 443, but that cannot be enabled or disabled by the PLD fabric 400 and that cannot be disabled across the external access bus 443. In various embodiments, assertion of a hard lock is generally one-way and eliminates the ability of the PLD fabric 400 and/or external access bus 443 to further modify the lock status of all secured resources within the secure PLD 410. In some embodiments, such locking scheme may be implemented by four bits for each resource (e.g., bus/port or sector of memory within the NVM 450), one bit each for hard lock enable, read lock enable, write lock enable, and erase lock enable.

As shown in the embodiment illustrated by FIG. 4, the NVM 450 may include multiple differentiated lockable sectors, each of which may have its own lock status. Such lockable sectors may include, for example, one or more of a first configuration image sector 452, a second configuration image sector 454, a manufacturer-specified trim sector 456, a device key sector 458 (e.g., an AES key sector and a separate public key/key pair sector), a lock policy selector 460, a user flash memory (UFM) sector 462, and/or other defined securable storage sectors 464, as shown. In some embodiments, the UFM sector 462 may be further differentiated into subsectors each of which may have its own lock status. The lock policy sector 460 may store the lock status of each sector of the NVM 450, for example, including its own lock status. First and second configuration image sectors 452-454 may each store a configuration for the PLD fabric 400, for example, and may further be tagged by version and/or date and as pre-authenticated so as to allow them to be selected (e.g., based on version or date) and used to program the PLD fabric 400 without performing an authentication process. The trim sector 456 may be used to store manufacture trim and/or other data specific to a particular secure PLD 410, for example, such as a modifiable customer-specific ordering part number derived from the device ID 422 and a general customer ID number, as described herein. The device key sectors 458 may be used to store encryption/decryption keys, and/or other security keys specific to a particular secure PLD 410. The lock policy sector 460 may be configured to store lock statuses for resources of the NVM 450, the configuration engine 440, the configuration I/O 448, and/or other elements of the secure PLD 410. The UFM sector 462 may be used to store user data generally accessible by the PLD fabric 400, such as configurations or application-specific security keys, certificates, and/or other secure (d) user data. Any one or more individual elements, portions, or sectors of the NVM 450 may be implemented as configurable memory, for example, or one time programmable (OTP) memory.

The programmable I/O 404 may be implemented as at least partially configurable resources configured to provide or support a communication link between the PLD fabric 400 and an external controller, memory, and/or other device, for example, across a bus 402 (e.g., a bus configured to link portions of the PLD fabric 400 to the programmable I/O 404). In some embodiments, the bus 402 and/or the programmable I/O 404 may be integrated with the PLD fabric 400. The configuration I/O 448 may be implemented as hard IP resources configured to support one or more external bus interfaces and/or protocols 449 to support communications with the external system 130/machine readable medium 136, as described herein. In some embodiments, the configuration I/O 448 and/or the bus 443 may be integrated with the configuration engine 440. More generally, the configuration I/O 448 and/or the bus 443 may be integrated with the configuration engine 440. More generally, one or more elements of the secure PLD 410 shown as separate in FIG. 4 may be integrated with and/or within each other. Other IC modules 480 may be implemented as hard and/or configurable IP resources configured to facilitate operation of the secure PLD 410.

Figure 5:
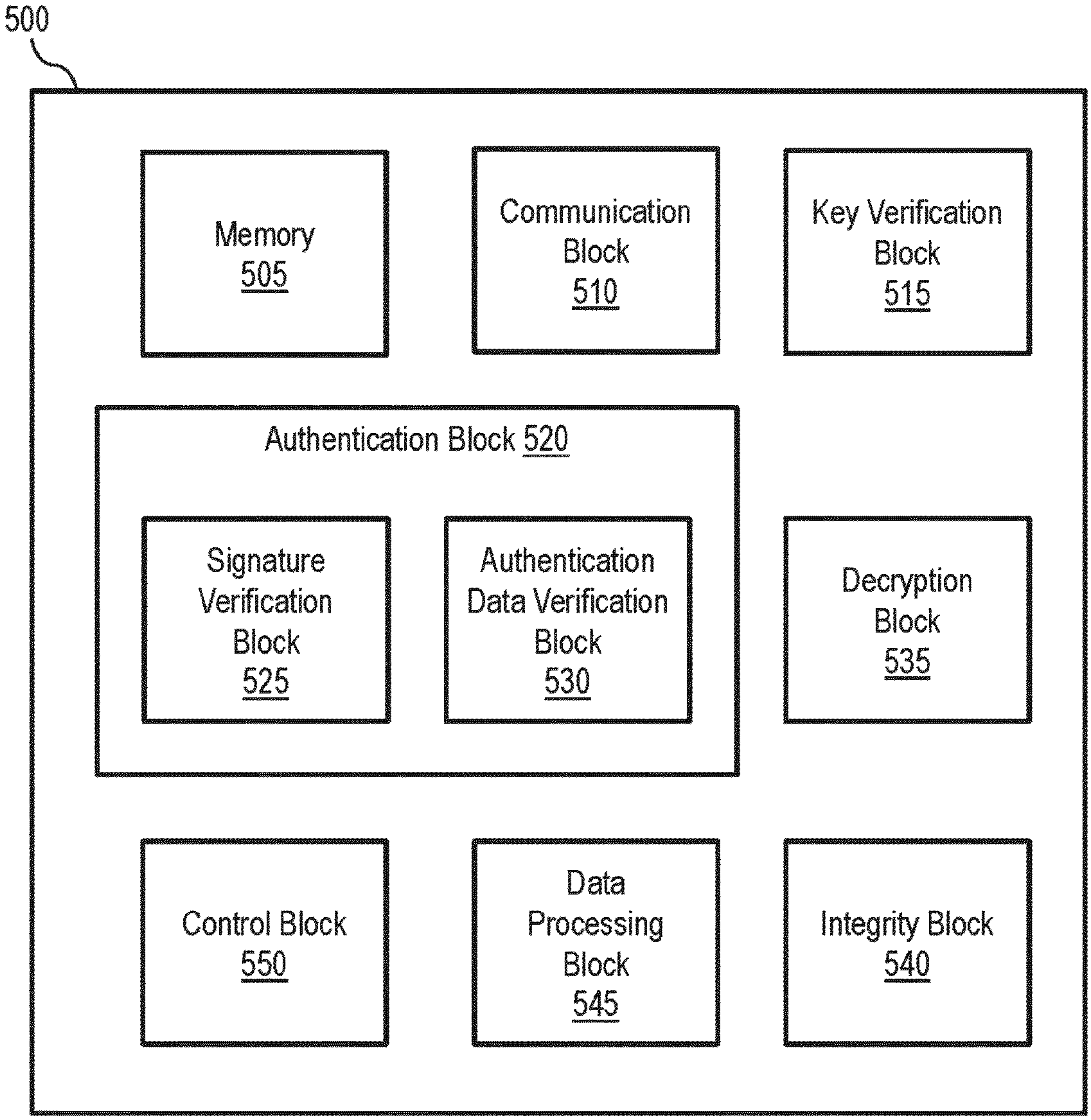
FIG. 5 illustrates a block diagram of an example system for implementing parallel processing for facilitating bitstream security in accordance with one or more embodiments of the present disclosure.

FIG. 5 illustrates a block diagram of an example system 500 for implementing parallel processing for facilitating bitstream security in accordance with one or more embodiments of the present disclosure. The system 500 includes a memory 505, a communication block 510, a key verification block 515, an authentication block 520, a decryption block 535, an integrity block 540, a data processing block 545, and a control block 550. The authentication block 520 includes a signature verification block 525 and an authentication data verification block 530. Example operations/functionalities associated with the key verification block 515, the authentication block 520 (e.g., including the signature verification block 525 and the authentication data verification block 530), the decryption block 535, the integrity block 540, the data processing block 545, and the control block 550 are described for example with respect to FIGS. 6 and 7.

It is noted that not all of the depicted blocks may be required, however, and one or more embodiments may include additional blocks not shown in the figure. Variations in the arrangement and type of the blocks may be made without departing from the spirit or scope of the claims as set forth herein. Additional blocks, different blocks, and/or fewer blocks may be provided. In some embodiments, the system 500 may be used to receive and process authenticated and encrypted bitstreams. In some embodiments, the system 500 may be used to receive bitstreams that are not encrypted (e.g., also referred to as plaintext bitstreams), such as authenticated-only bitstreams. Dependent on application, the decryption block 535 may be optional, may be selectively deactivated (e.g., the system 500 may be able to handle authenticated-only bitstreams as well as authenticated and encrypted bitstreams), or is not present in the system 500 (e.g., the system 500 does not handle encrypted bitstreams).

The system 500 may include one or more chips. In some embodiments, the system 500 may include multi-chip module/system with multiple chips/die. Die-to-die interfaces (e.g., implemented in part by the communication block 510 in some cases) may be used to facilitate communication between the die of a multi-chip architecture. In other embodiments, the system 500 may include a single chip. Operations/functionalities associated with the various blocks (e.g., 505, 510, 515, 520, 525, 530, 535, 540, 545, 550) of the system 500, which may also be referred to as and/or include components, elements, devices, circuits, modules, and/or structures of the system 500, may be implemented with any combination of software instructions, firmware instructions, and/or electronic hardware (e.g., inductors, capacitors, amplifiers, actuators, or other analog and/or digital components). Furthermore, while example operations/functionalities are associated with and described with reference to each of the various components of the system 500, the separation/association of the operations/functionalities into distinct components may be arbitrary and for explanatory purposes to describe the various operations/functionalities (e.g., performed on a received bitstream by the system 500) and operational flow associated with the system 500. In some embodiments, the various blocks of the system 500 may be, may include, may implement, may be a part of, and/or may utilize functionality of a security engine (e.g., the security engine 420), a configuration engine (e.g., the configuration engine 440), and/or other blocks, such as those described with respect to the secure PLD 410.

The memory 505 may be implemented by one or more memory devices providing machine readable mediums such as volatile memory (e.g., random access memory), non-volatile non-transitory memory (e.g., read-only memory, electrically-erasable read-only memory, flash memory), or other types of memory. In various embodiments, the memory 505 may store software instructions to be executed by the various blocks of the system 500 and/or data for use by the various blocks (e.g., a version of a bitstream provider's public key stored in the memory 505 for facilitating bitstream processing and security). Although the memory 505 is illustrated as being a separate block, the memory 505 may represent memory of other blocks, such as the key verification block 515 or the authentication block 520, alternative to or in addition to memory separate from the other blocks.

The communication block 510 may be implemented with appropriate hardware to provide wired and/or wireless data communication between the various components of the system 500 (e.g., such as die-to-die communication for a multi-chip system and/or intra-chip communication) and/or between the system 500 and other devices. For example, in some embodiments, the communication block 510 may include a network interface (e.g., an Ethernet interface, a Wi-Fi interface, and/or others), a serial interface, a parallel interface, and/or other types as appropriate. In some cases, the communication block 510 may facilitate communication with a storage device that stores bitstream to be processed by the system 500. In some cases, the communication block 510 may include a streaming interface(s), such as SSPI, for receiving bitstreams from an external streaming source(s).

Figure 6:
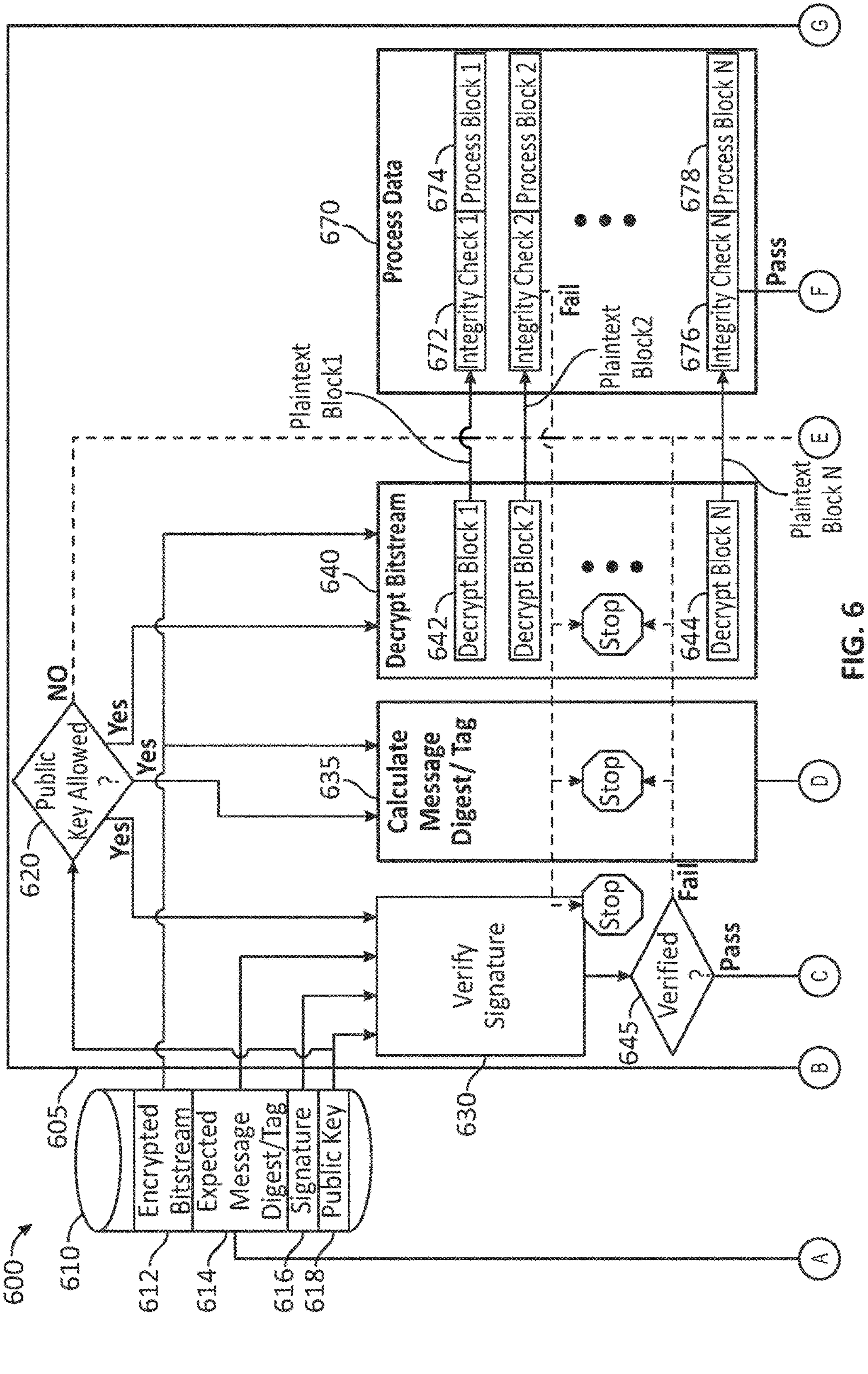
FIG. 6 illustrates a flow diagram of an example process for implementing parallel processing for facilitating bitstream security for an authenticated and encrypted bitstream in accordance with one or more embodiments of the present disclosure.
Figure 6:
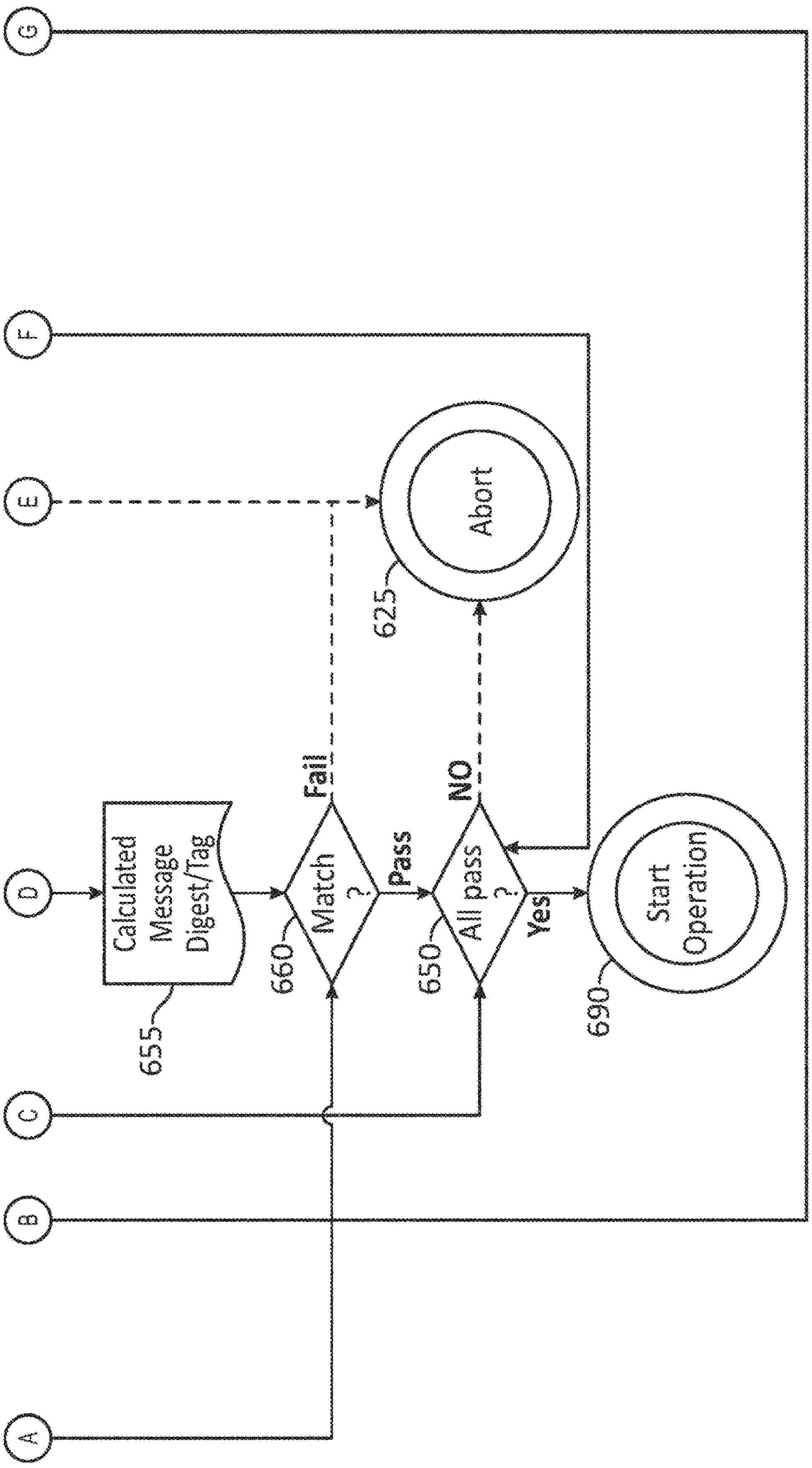
Figure 7:
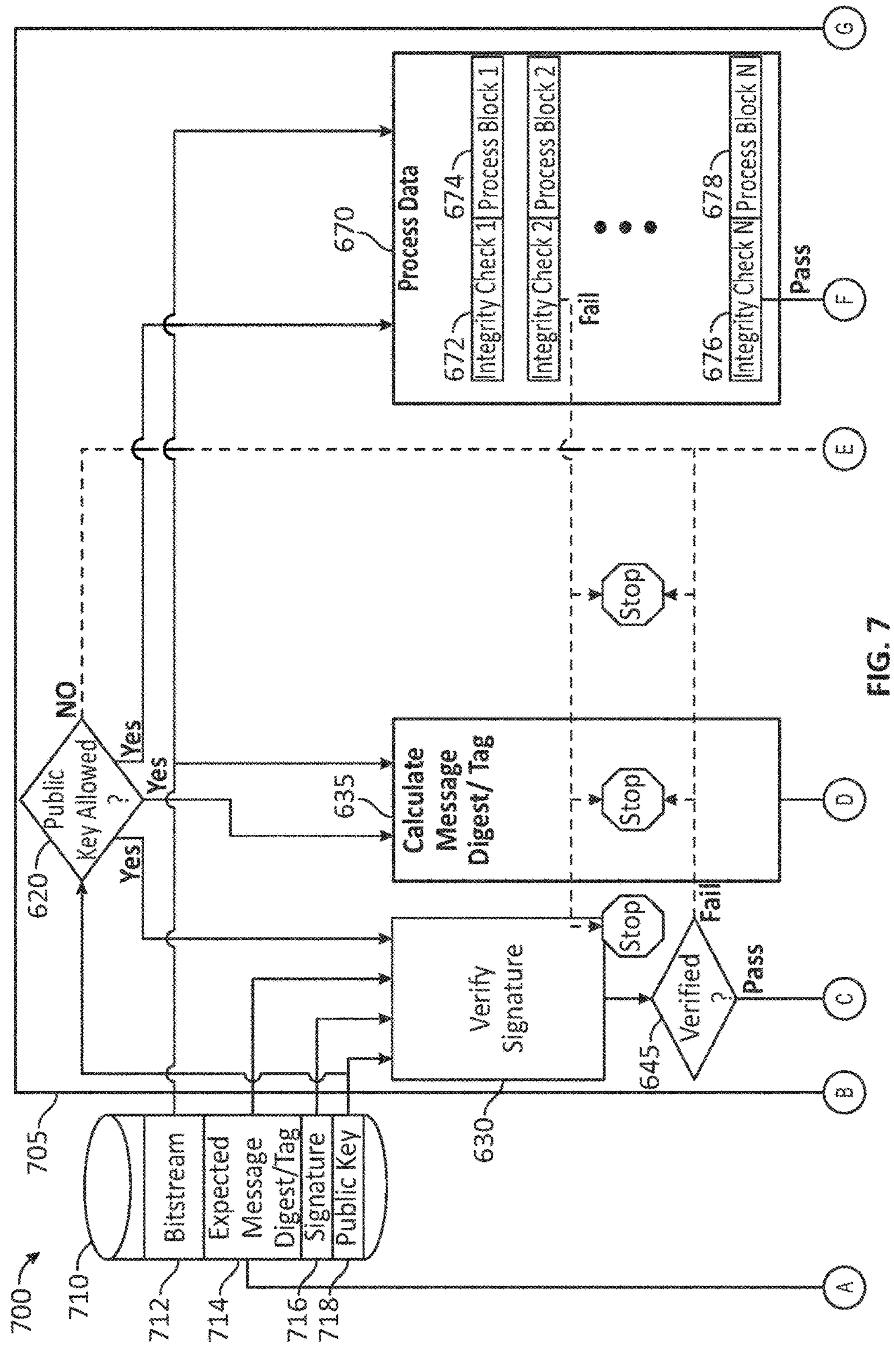
FIG. 7 illustrates a flow diagram of an example process for implementing parallel processing for facilitating bitstream security for an authenticated bitstream in accordance with one or more embodiments of the present disclosure.
Figure 7:
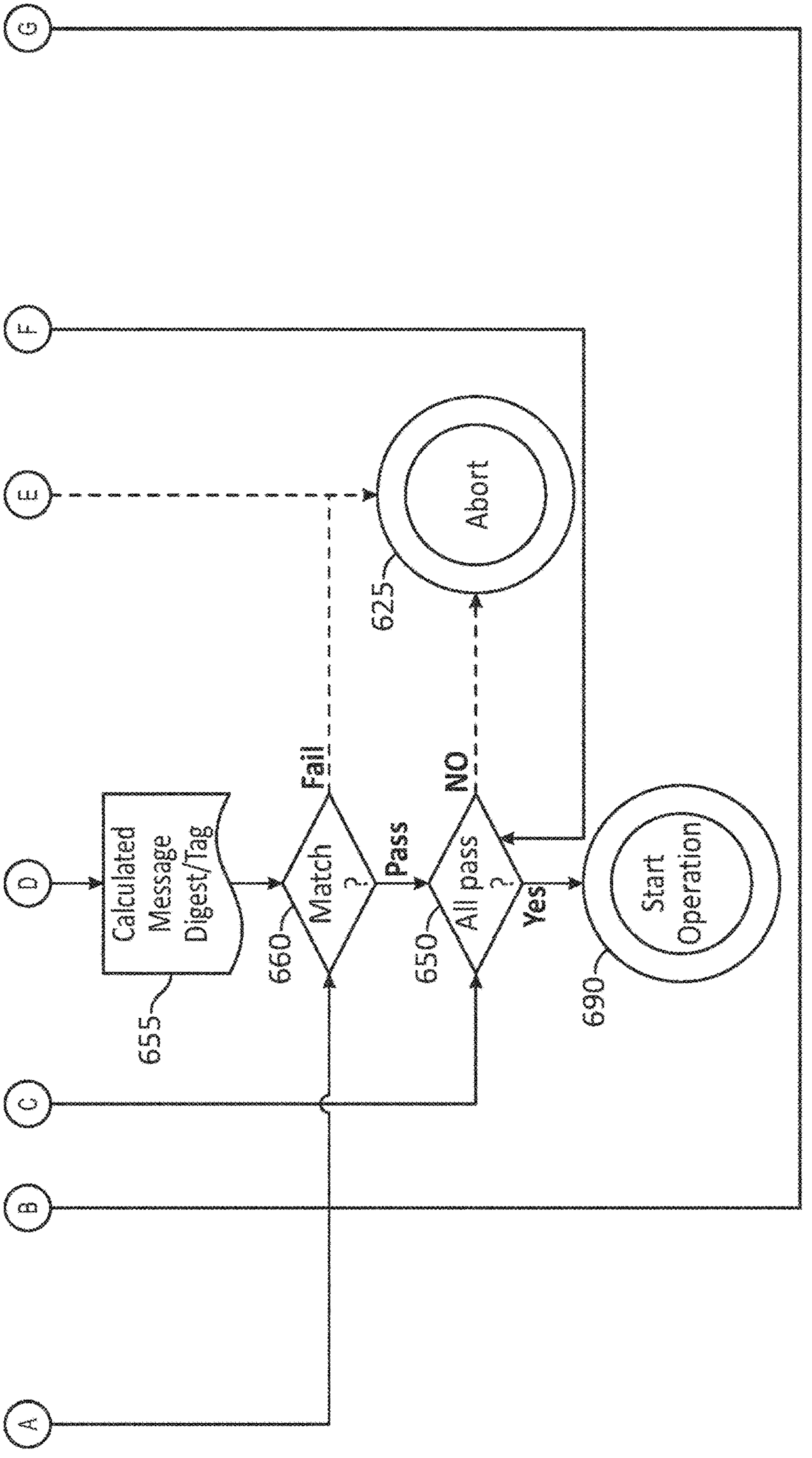

Example operations/functionalities associated with the key verification block 515, the authentication block 520 (e.g., including the signature verification block 525 and the authentication data verification block 530), the decryption block 535, the integrity block 540, the data processing block 545, and the control block 550 are described for example with respect to FIG. 6 and/or FIG. 7.

FIG. 6 illustrates a flow diagram of an example process 600 (e.g., also referred to as an operational flow) for implementing parallel processing for facilitating bitstream security for an authenticated and encrypted bitstream in accordance with one or more embodiments of the present disclosure. The process 600 may be performed by a system 605 that receives an encrypted bitstream 612 from a storage device 610. In some embodiments, the system 605 may be, may include, may be a part of, and/or may implement the system 500 of FIG. 5. In this regard, although for explanatory/exemplary purposes, the system 605 and the process 600 are described with reference to the system 500 of FIG. 5 and its various blocks, the system 605 and/or the process 600 may be implemented using other systems, devices, and blocks, and including a different selection of electronic systems, devices, blocks, assemblies, and/or arrangements.

As shown in FIG. 6, the storage device 610 may store the encrypted bitstream 612, authentication data 614 (e.g., also referred to as authentication-related data or authentication-facilitating data) associated with the encrypted bitstream 612, a signature 616 associated with the encrypted bitstream 612, and a public key 618 (e.g., also referred to as a bitstream authentication public key) associated with a device that generated the encrypted bitstream 612. In some aspects, the storage device 610 may be a static storage device, such as a flash device, from which the system 605 may access (e.g., read) and/or otherwise receive the encrypted data 612 and other data (e.g., 614, 616, 618) stored on the storage device 610. In other aspects, the storage device 610 may represent an external streaming source that sends (e.g., streams) the encrypted bitstream 612 and other data (e.g., 614, 616, 618) to the system 605. An example system/process associated with providing encrypted and authenticated bitstreams in a storage device (e.g., a static storage device and/or a streaming source) is described with respect to FIG. 8. In some embodiments, the encrypted bitstream 612 may be, may include, or may be part of an encrypted configuration bitstream containing configuration data for configuring/programming a PLD (e.g., an FGPA). As an example, in such embodiments, the system 605 may be, may include, may be a part of, and/or may implement a security engine and/or a configuration engine, such as the security engine 420 and the configuration engine 440 of FIG. 4.

At block 620, the system 605 (e.g., the key verification block 515) determines whether the public key 618 from the storage device 610 is an authorized public key (e.g., also referred to as an allowed public key). In an aspect, an authorized public key is associated with a device that is authorized/allowed to communicate with the system 605. Such communication may include direct communication of data between the system 605 and the device and/or indirect communication of data (e.g., with the device storing data to the storage device 610 for access by the system 605). This device may generate and/or provide bitstreams, such as the encrypted bitstream 612 and/or other bitstreams, to the system 605 (e.g., including storing such bitstreams to the storage device 610), and the device's public key may identify the device as the generator and/or provider associated with these bitstreams.

The system 605 may locally store (e.g., in the memory 505) and/or remotely store (e.g., external storage with or without cryptographic protections and accessible to the system 605) one or more authorized public keys (e.g., full key value storage) or data associated with (e.g., data indicative of) such authorized public key(s). Data associated with a public key(s) may be referred to as a version of the public key(s). In an aspect, the system 605 may store a hashed version (e.g., or simply referred to as a hash) of one or more authorized keys. When the system 605 stores a full key value of a public key(s), the system 605 (e.g., the key verification block 515) may perform a key verification/check by comparing the public key 618 from the storage device 610 with the full key value of the corresponding public key stored by the system 605, with the public key 618 determined to be an authorized public key if this comparison results in a match. When the system 605 stores a hash of a public key(s), the system 605 (e.g., the key verification block 515) may perform a key verification/check by hashing the public key 618 to generate a hashed public key and comparing the hashed public key with a corresponding hashed authorized key stored by the system 605, with the public key 618 determined to be an authorized public key if this comparison results in a match.

If the determination at block 620 is that the public key 618 is not an authorized public key, the process 600 proceeds from block 620 to block 625. At block 625, the system 605 (e.g., the control block 550) aborts the process 600. In an aspect, the system 605 aborting of the process 600 may be referred to a mitigation action performed by the system 605 (e.g., in response to the failed public key verification in this case). In this regard, in proceeding from block 620 (e.g., perform a key check as an initial step) straight to block 625, the system 605 performs the process 600 and ends the process 600 immediately without performing any subsequent blocks (e.g., blocks associated with processing the encrypted bitstream 612). The process 600 may be ended before blocks 630 (e.g., signature verification), 635 (e.g., authentication data computation), and 640 (e.g., bitstream decryption) start being performed. In an embodiment, when the encrypted bitstream 612 is a configuration bitstream that the system 605 can process (e.g., authenticate and decrypt) and use to program/configure a PLD, the system 605 may abort the process 600 and shutdown the PLD (e.g., including the system 605). A shutdown process may clear any system parameters populated by execution of the process 600 thus far, clear memory of the PLD, clear any keys in temporary storage, and so forth and/or reset various values to typical, stored, and/or learned values to be used next time the process 600 or other process is initiated.

If the determination at block 620 is that the public key 618 is an authorized public key, the process 600 proceeds from block 620 to blocks 630, 635, and 640. In some embodiments, blocks 630, 635, and 640 are performed in parallel. As indicated above, in some embodiments, such parallel processing may allow the encrypted bitstream 612 and other data (e.g., 614, 616, 618) to be read once from the storage device 610 and the read data provided to each of blocks 630, 635, and 640 as appropriate, in contrast to serialized techniques in which, for example, data content would be read multiple times (e.g., at least once to authenticate the data content and at least one more time to decrypt the data content). In some aspects, block 670 may be performed in parallel with any operations of blocks 630, 635, and 640 not yet completed. In this regard, block 670 may start processing data upon receipt of plaintext data (e.g., a first decrypted data block) from block 640.

At block 630, the system 605 (e.g., the signature verification block 525) performs a verification of the signature 616 based on the authentication data 614 to obtain a verification result (e.g., a signature verification result). In some cases, the verification of the signature 616 is also based on the public key 618. As indicated above, the authentication data 614, the signature 616, and the public key 618 may be received by the system 605 from the storage device 610, which may represent a static storage device, a streaming source, and/or generally any source of the data (e.g., 612, 614, 616, 618) for the system 605. In an aspect, the authentication data 614 and the signature 616 may be referred to as a predetermined authentication data and a predetermined signature, respectively, since the authentication data 614 and the signature 616 are predetermined by the generator and/or provider of the encrypted bitstream 612 and provided in the storage device 610. The cryptographic algorithm used by the system 605 and the public key 618 corresponds to the cryptographic algorithm and a private key, respectively, used by a device that generated the signature 616.

By way of non-limiting examples, cryptographic algorithms that may be utilized in the process 600 and associated encryption-side process may include an asymmetric cryptographic algorithm such as ECDSA, RSA, etc., a post-quantum algorithm such as extended Merkle signature scheme (XMSS), Leighton-Macali signature (LMS) scheme, etc., and/or generally any cryptographic algorithm dependent on application/preferences (e.g., security requirements, computational time/resource requirements, etc.). As one example, the signature verification performed by the system 605 may be based on a technique such as RSA in which the system 605 performs a decryption operation on the signature 616 from the storage device 610 using the public key 618 from the storage device 610 and compares the decrypted signature with the authentication data 614 from the storage device 610 to obtain a verification result.

At block 645, the system 605 (e.g., the signature verification block 525) determines whether the verification result obtained at block 630 indicates a pass or a fail. If the verification result indicates a fail (e.g., signature verification failed), the process 600 proceeds from block 645 to block 625. At block 625, the system 605 (e.g., the control block 550) aborts the process 600 as described above. In this regard, the system 605 may abort any ongoing operations of the system 605 occurring in parallel, such as those performed in relation to block 635 and/or 660 (e.g., authentication data verification), block 640 (e.g., bitstream decryption), and/or block 670 (e.g., decrypted bitstream processing). If the verification result indicates a pass (e.g., signature verification passed), the process 600 proceeds from block 645 to block 650. At block 650, the system 605 (e.g., the control block 550) determines whether authentication and decryption of the encrypted bitstream 612 are successful based on results from blocks 645, 660, and 670, as further described herein.

At block 635, the system 605 (e.g., the authentication data verification block 530) computes authentication data based on the encrypted bitstream 612 to obtain computed authentication data 655. At block 660, the system 605 (e.g., the authentication data verification block 530) performs a verification of the authentication data 614 based on the computed authentication data 655 to obtain a verification result (e.g., an authentication data verification result). The system 605 may perform the verification based on a comparison of the computed authentication data 655 and the authentication data 614. The authentication data 614 may pass verification when the comparison results in a match and may fail verification when the comparison does not result in a match.

In some aspects, as non-limiting examples shown in FIG. 6, the computed authentication data 655 and the authentication data 614 from the storage device 610 may be, or may include, a message digest and/or a tag. Since the predetermined authentication data 614 is used as a basis for comparison with the computed authentication data 655, the predetermined authentication data 614 may be referred to as expected authentication data (e.g., an expected message digest and/or an expected tag). In one aspect, the authentication data 614 may include a message digest and the system 605 may generate the computed authentication data 655 (e.g., a computed message digest) based on the encrypted bitstream 612. For example, the system 605 may generate the authentication data 655 as, or based on, a hash of the encrypted bitstream 612. In another aspect, the authentication data 614 may include a tag and the system 605 may generate the computed authentication data 655 (e.g., a computed tag) based on the encrypted bitstream 612 and a cryptographic key. For example, the system 605 may generate the tag using AES-Galois/Counter Mode (AES-GCM).

If the verification result at block 660 indicates a fail (e.g., authentication data verification failed), the process 600 proceeds from block 660 to block 625. At block 625, the system 605 (e.g., the control block 550) aborts the process 600 as described above. In this regard, the system 605 may abort any ongoing operations of the system 605 occurring in parallel, such as those performed in relation to block 630 and/or 645 (e.g., signature verification), block 640 (e.g., bitstream decryption), and/or block 670 (e.g., decrypted bitstream processing). If the verification result indicates a pass (e.g., authentication data verification passed), the process 600 proceeds from block 660 to block 650. At block 650, the system 605 (e.g., the control block 550) determines whether authentication and decryption of the encrypted bitstream 612 are successful based on results from blocks 645, 660, and 670.

At block 640, the system 605 (e.g., the decryption block 535) decrypts the encrypted bitstream 612 to obtain a decrypted bitstream. By way of non-limiting examples, depending on encryption/decryption scheme/technique, each encrypted data block may be 64 bits, 128 bits, 192 bits, 256 bits, or any other number of bits. In some aspects, as shown in FIG. 6, the encrypted bitstream 612 may include multiple encrypted data blocks (e.g., also referred to simply as encrypted blocks). In such aspects, the system 605 may decrypt each encrypted data block. For example, at block 642, the system 605 (e.g., the decryption block 535) decrypts a first encrypted data block (e.g., "block 1") to obtain a first plaintext data block (e.g., "plaintext block 1" and also referred to as first decrypted data block).

At block 670, the system 605 (e.g., the integrity block 540 and the data processing block 545) processes the decrypted bitstream. When the decrypted bitstream is formed of decrypted blocks, the system 605 may process the decrypted bitstream block-by-block (e.g., as the integrity block 540 receives decrypted data blocks from the decryption block 535). For example, at block 672, the system 605 (e.g., the integrity block 540) determines an integrity associated with the first plaintext data block obtained at block 642. In some aspects, the integrity associated with the first plaintext data block (and other plaintext data blocks) may be determined by performing an integrity check(s). By way of non-limiting examples, integrity checks may be implemented as and/or based on syntax checks for legal data syntax, parity checks, cyclic redundancy checks, cryptographic hashes, error correction codes, and/or generally any integrity checking function(s). In an aspect, an integrity check may be performed on a given plaintext data block to detect any content-based tampering associated with the plaintext data block.

If the first plaintext data block is determined to have failed an integrity check at block 672, the process proceeds from block 672 to block 625. At block 625, the system 605 (e.g., the control block 550) aborts the process 600. In this regard, the system 605 may abort any ongoing operations, such as those performed in relation to block 630 and/or 645 (e.g., signature verification), block 635 and/or 660 (e.g., authentication data verification), block 640 (e.g., bitstream decryption), and/or block 670 (e.g., decrypted bitstream processing). In some implementations, the system 605 (e.g., the decryption block 535) may be decrypting a second encrypted data block (e.g., "block 2") or later encrypted data block and/or determining an integrity of the second decrypted data block or later decrypted data block in parallel with the system 605 (e.g., the integrity block 540) determining an integrity of the first plaintext data block at block 672. In other implementations, the system 605 (e.g., the decryption block 535) does not begin decrypting the second encrypted data block until after the first plaintext data block is determined to pass the integrity check at block 672.

If the first plaintext data block is determined to have passed an integrity check at block 672, the process proceeds from block 672 to block 674. At block 674, the system 605 (e.g., the data processing block 545) processes the first plaintext data block. Such processing may be dependent on type of content included in the encrypted bitstream 612 and may include storing the first plaintext data block and/or using (e.g., displaying, playing content associated with) the first plaintext data block while remaining data associated with the encrypted bitstream 612 is being decrypted/extracted, integrity checked, and otherwise processed. In some embodiments, when the encrypted bitstream 612 includes a configuration bitstream, the first plaintext data block may provide a portion of the configuration bitstream for configuring/programming a PLD. In such embodiments, at block 674, the system 605 may configure/program the PLD using the portion of the configuration bitstream associated with the first plaintext data block.

At block 644, the system 605 (e.g., the decryption block 535) decrypts an $N^{th}$ encrypted data block (e.g., "block N") to obtain an $N^{th}$ plaintext data block (e.g., "plaintext block N" and also referred to as $N^{th}$ decrypted data block). At block 676, the system (e.g., the integrity block 540) the system 605 (e.g., the integrity block 540) determines an integrity associated with the $N^{th}$ plaintext data block obtained at block 644. If the $N^{th}$ plaintext data block is determined to have failed an integrity check at block 676, the process 600 proceeds from block 676 to block 625. At block 625, the system 605 (e.g., the control block 550) aborts the process 600. If the $N^{th}$ plaintext data block is determined to have passed an integrity check at block 676, the process 600 proceeds from block 676 to block 678. At block 678, the system 605 (e.g., the data processing block 545) processes the $N^{th}$ plaintext data block. Intervening encrypted data blocks 2 through (N−1) may be decrypted between blocks 642 and 644, and the corresponding plaintext data blocks 2 through (N−1) may be integrity checked between blocks 672 and 676 and processed between blocks 674 and 678. As provided above, if any ongoing operations of the system 605 direct the process 600 to block 625, the process 600 may be aborted, such that decryption of the encrypted bitstream 612 may be aborted prior to decrypting the $N^{th}$ encrypted data block at block 644, determining an integrity of the $N^{th}$ plaintext data block at block 676, or processing the $N^{th}$ plaintext data block at block 678. In some embodiments, determining an integrity on a block-by-block basis may allow early detection of data tampering relative to techniques in which the entire encrypted bitstream is decrypted and a single integrity check performed on the entire decrypted bitstream.

Further, if the $N^{th}$ plaintext data block (i.e., the last plaintext data block) is determined to have passed an integrity check at block 676, the process 600 proceeds from block 676 to block 650. In some cases, the system 605 may provide an indication to block 650 (e.g., to the control block 550) when the $N^{th}$ plaintext data block is determined to have passed its integrity check at block 676 and the $N^{th}$ plaintext data block has been proceeded at block 678.

At block 650, the system 605 (e.g., the control block 550) determines whether authentication and decryption of the encrypted bitstream 612 are successful based on results from blocks 645, 660, and 670. Authentication of the encrypted bitstream 612 may be associated with operations performed in relation to, for example, blocks 630, 645, 635, and 660 (e.g., by the authentication block 520). In an embodiment, authentication of the encrypted bitstream 612 may be considered successful if both the signature verification result at block 640 and the authentication data verification result at block 660 indicate a pass. In an embodiment, decryption of the encrypted bitstream 612 may be considered successful if the entire decrypted bitstream (e.g., all the decrypted data blocks) pass their integrity checks.

If any of blocks 645, 660, and 670 indicate a failed state (e.g., failed authentication and/or failed decryption), the process 600 proceeds from block 650 to block 625. At block 625, the system 605 (e.g., the control block 550) aborts the process 600 as described above. If all of blocks 645, 660, and 670 indicate a success state in which the encrypted bitstream 612 is determined to have been successfully authenticated and successfully decrypted, the process 600 proceeds from block 650 to block 690. At block 690, the system 605 allows an operational state in which the entirety of the encrypted bitstream 612 has been authenticated and decrypted. Such an operational state may be based on the type of content associated with the encrypted bitstream 612. In some embodiments, when the encrypted bitstream 612 includes a configuration bitstream, the system 605 (e.g., the control block 550) may allow a start of operation of (e.g., wake up functionality of) the configured PLD.

FIG. 7 illustrates a flow diagram of an example process 700 for implementing parallel processing for facilitating bitstream security for an authenticated bitstream in accordance with one or more embodiments of the present disclosure. The description of FIG. 6 generally applies to FIG. 7, with examples of differences between FIG. 6 and FIG. 7 and other description provided herein.

The process 700 may be performed by a system 705 that receives a plaintext bitstream 712 from a storage device 710. In some embodiments, the system 705 may be, may include, may be a part of, and/or may implement the system 500 of FIG. 5. In this regard, although for explanatory/exemplary purposes, the system 705 and the process 700 are described with reference to the system 500 of FIG. 5 and its various blocks, the system 705 and/or the process 700 may be implemented using other systems, devices, and blocks, and including a different selection of electronic systems, devices, blocks, assemblies, and/or arrangements.

As shown in FIG. 7, the storage device 710 may store the plaintext bitstream 712, authentication data 714 associated with the plaintext bitstream 712, a signature 716 associated with the plaintext bitstream 712, and a public key 718 associated with a device that generated the encrypted bitstream 612. In some aspects, the storage device 710 may be a static storage device, such as a flash device, from which the system 705 may access (e.g., read) and/or otherwise receive the bitstream 712 and other data (e.g., 714, 716, 718) stored on the storage device 710. In other aspects, the storage device 710 may represent an external streaming source that sends (e.g., streams) the plaintext bitstream 712 and other data (e.g., 714, 716, 718) to the system 705. An example system/process associated with providing authenticated-only bitstreams in a storage device (e.g., a static storage device and/or a streaming source) is described with respect to FIG. 9. In some embodiments, the plaintext bitstream 712 may be, may include, or may be part of a configuration bitstream containing configuration data for configuring/programming a PLD (e.g., an FGPA). As an example, in such embodiments, the system 705 may be, may include, may be a part of, and/or may implement a security engine and/or a configuration engine, such as the security engine 420 and the configuration engine 440 of FIG. 4.

As shown in FIG. 7, the system 705 may be, or may be considered as, the system 605, except without block 640 (e.g., the decryption block 535) or with block 640 deactivated. In some embodiments, blocks 630, 635, and 670 are performed in parallel. As such, the bitstream 712 is directly processed at block 670 without needing to first be decrypted. As indicated above, in some embodiments, such parallel processing may allow the bitstream 712 and other data (e.g., 714, 716, 718) to be read once from the storage device 710 and the read data provided to each of blocks 630, 635, and 670 as appropriate. In some implementations, the system 705 (e.g., data processing block 670) may be determining an integrity of multiple plaintext data block in parallel. In other implementations, the system 705 may determine an integrity of a current plaintext data block and move on to determining an integrity of a next plaintext data block when the current plaintext data block is determined to pass its integrity check.

At block 650, the system 605 (e.g., the control block 550) determines whether authentication and processing of the bitstream 712 are successful based on results from blocks 645, 660, and 670. Authentication of the bitstream 712 may be associated with operations performed in relation to, for example, blocks 630, 645, 635, and 660 (e.g., by the authentication block 520). In an embodiment, authentication of the bitstream 712 may be considered successful if both the signature verification result at block 640 and the authentication data verification result at block 660 indicate a pass. In an embodiment, processing of the bitstream 712 may be considered successful if the entire bitstream (e.g., all the plaintext data blocks) pass their integrity checks (e.g., indicative of no corruption during a transmission of the bitstream).

If any of blocks 645, 660, and 670 indicate a failed state (e.g., failed authentication and/or failed decryption), the process 600 proceeds from block 650 to block 625. At block 625, the system 605 (e.g., the control block 550) aborts the process 700 as described above. If all of blocks 645, 660, and 670 indicate a success state in which the bitstream 712 is determined to have been successfully authenticated and successfully decrypted, the process 700 proceeds from block 650 to block 690. At block 690, the system 705 allows an operational state in which the entirety of the bitstream 712 has been authenticated and processed. Such an operational state may be based on the type of content associated with the bitstream 712. In some embodiments, when the bitstream 712 includes a configuration bitstream, the system 705 (e.g., the control block 550) may allow a start of operation of (e.g., wake up functionality of) the configured PLD.

Figure 8:
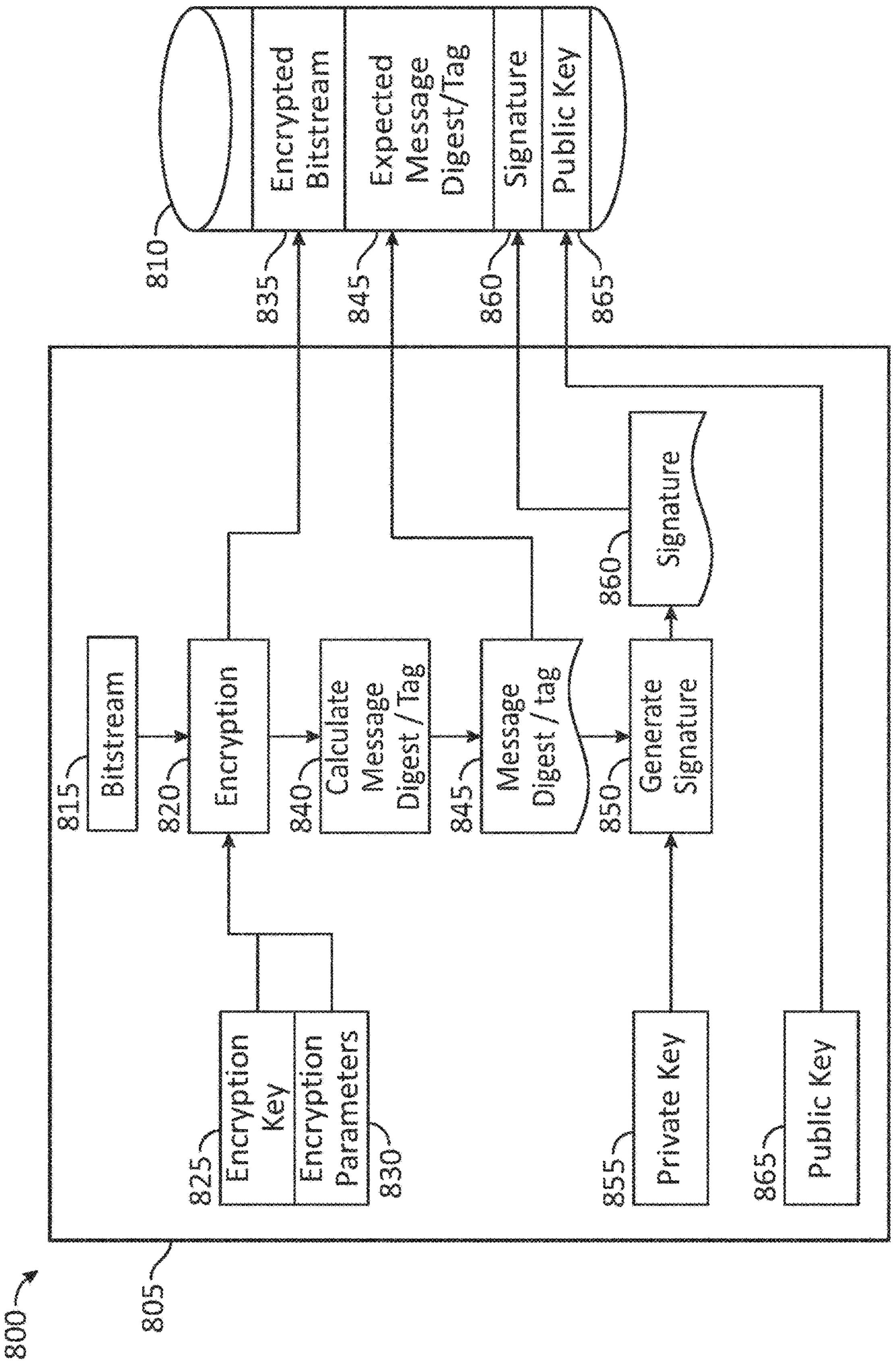
FIG. 8 illustrates a flow diagram of an example process for generating an encrypted and authenticated bitstream in accordance with one or more embodiments of the present disclosure.

FIG. 8 illustrates a flow diagram of an example process 800 for generating an encrypted and authenticated bitstream in accordance with one or more embodiments of the present disclosure. The process 800 may be performed by a system 805 to generate an encrypted and authenticated bitstream. In some embodiments, the encrypted and authenticated bitstream may be provided to the system 605 of FIG. 6.

At block 820, the system 805 performs encryption on a bitstream 815 (e.g., a plaintext bitstream) based on an encryption key 825 and an encryption parameter(s) 830 to generate an encrypted bitstream 835. The encrypted bitstream 835 may be stored in a storage device 810. In some cases, the encryption parameter(s) may include an initialization vector (IV). As a non-limiting example, the system 805 may perform the encryption using AES-GCM), in which the encryption key 825 may be referred to as an AES encryption key. Alternatively or in addition, the system 805 may be operated to perform encryption using other algorithms as desired (e.g., based on desired/required security), with such algorithms being associated with encryption keys (e.g., key sizes) and encryption parameters appropriate for the algorithms.

In some aspects, the system 805 may generate the bitstream 815 and process the bitstream 815. In other aspects, the system 805 may receive the bitstream 815 (e.g., from another system) and process the bitstream 815. In some cases, the bitstream 815 may be generated using a bitstream creation/generation tool, which may be operated/run by the system 805 and/or other system. In some embodiments, the bitstream 815 may be a configuration bitstream (e.g., FPGA bitstream) that is generated by the system 805 and/or other system. For example, the system 805 and/or other system may run PLD configuration software (e.g., Lattice Radiant software) to generate the bitstream 815. In this example, the system 130 of FIG. 1 may include the system 805 and/or other system that generates the bitstream 815, such as by performing the process 300, for use in configuring/programming the PLD 100, and/or the machine readable medium 136 and/or the memory 134 may include the storage device 810.

At block 840, the system 805 generates authentication data 845 associated with authentication of the bitstream 815 based on the encrypted bitstream 835. In some aspects, as non-limiting examples shown in FIG. 8, the authentication data 845 may be, or may include, a message digest and/or a tag. In some cases, the system 805 may generate a message digest based on the encrypted bitstream 835. For example, the message digest may be, or may be based on, a hash of the encrypted bitstream 835. In some cases, the system 805 may generate a tag based on the encrypted bitstream 835 and a cryptographic key. For example, the tag may be generated by AES-GCM. As shown in FIG. 8, the authentication data 845 may be stored in the storage device 810.

At block 850, the system 805 generates a signature 860 based on the authentication data 845 and a private key 855 associated with the system 805. As shown in FIG. 8, the signature 860 may be stored in the storage device 810. In some cases, the signature 860 may be generated using an asymmetric cryptographic algorithm, a post-quantum algorithm, and/or other algorithm. As non-limiting examples, the system 805 may perform an ECDSA signing operation, an RSA signing operation, or other signing operation to generate the signature 860. As shown in FIG. 8, a public key 865 associated with the system 805 may also be stored in the storage device 810. The public key 865 and the private key 855 may form a private/public key pair of the system 805.

In some embodiments, the encrypted and authenticated bitstream may be provided to the system 605 of FIG. 6. The storage device 810 may be, may include, may be a part of the storage device 610 of FIG. 6. In this regard, the encrypted bitstream 835, the authentication data 845, the signature 860, and the public key 865 in the storage device 810 may correspond to the encrypted bitstream 612, the authentication data 614, the signature 616, and the public key 618, respectively, in the storage device 610 of FIG. 6. The storage device 810 may be a static storage device, such as a flash device, or an external streaming source for providing the encrypted bitstream 835, the authentication data 845, the signature 860, and the public key 865.

Figure 9:
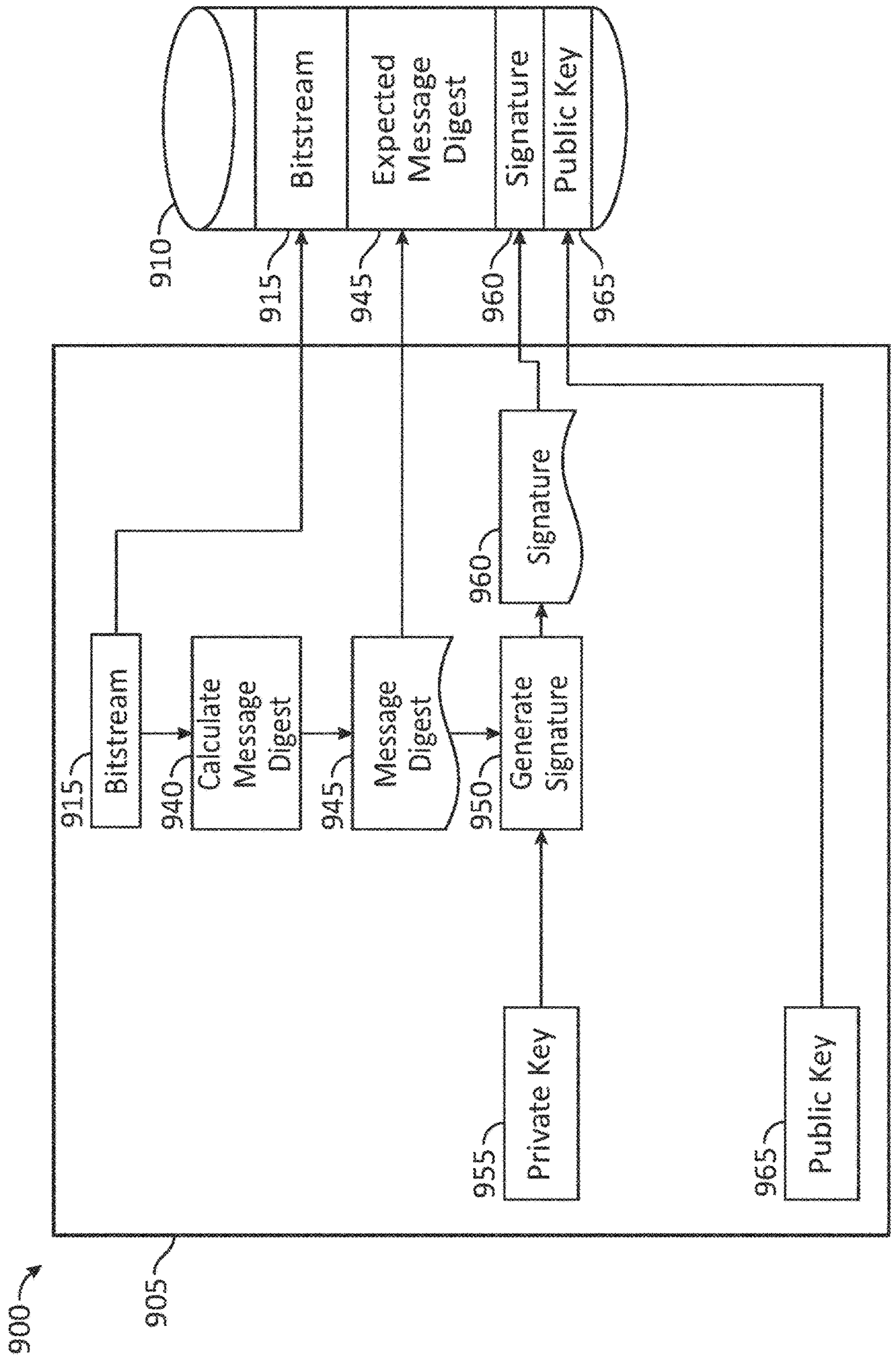
FIG. 9 illustrates a flow diagram of an example process for generating an authenticated bitstream in accordance with one or more embodiments of the present disclosure.

FIG. 9 illustrates a flow diagram of an example process 900 for generating an authenticated bitstream in accordance with one or more embodiments of the present disclosure. In some cases, an authenticated bitstream may be referred to as an authenticated-only bitstream (e.g., the bitstream is unencrypted). The process 900 may be performed by a system 905 to generate an encrypted and authenticated bitstream. In some embodiments, the authenticated bitstream may be provided to the system 705 of FIG. 7.

The description of FIG. 8 generally applies to FIG. 9, with examples of differences between FIG. 8 and FIG. 9 and other description provided herein. In some embodiments, the system 905 may be, may include, or may be a part of the system 805, and/or a storage device 910 may be, may include, or may be a part of the storage device 810. In some embodiments, a bitstream 915 (e.g., plaintext bitstream) may be the same as the bitstream 815, except the bitstream 915 is processed to obtain an authenticated-only bitstream according to the process 900 whereas the bitstream 815 is processed to obtain an encrypted and authenticated bitstream according to the process 800.

In some aspects, the system 905 may generate the bitstream 915 and process the bitstream 915. In other aspects, the system 905 may receive the bitstream 915 (e.g., from another system) and process the bitstream 915. In some embodiments, the bitstream 915 may be a configuration bitstream (e.g., FPGA bitstream) that is generated by the system 905 and/or other system. For example, the system 130 of FIG. 1 may include the system 805 and/or other system that generates the bitstream 915, such as by performing the process 300, for use in configuring/programming the PLD 100, and/or the machine readable medium 136 and/or the memory 134 may include the storage device 910.

At block 940, the system 905 generates authentication data 945 associated with authentication of the bitstream 915 based on the bitstream 915. In some aspects, as a non-limiting example shown in FIG. 9, the authentication data 945 may be, or may include, a message digest. The message digest may be, or may be based on, a hash of the bitstream 915. As one example, the message digest may be generated by SHA-2. As shown in FIG. 9, the authentication data 945 may be stored in the storage device 910.

At block 950, the system 905 generates a signature 960 based on the authentication data 945 and a private key 955 associated with the system 905. As shown in FIG. 9, the signature 960 may be stored in the storage device 910. In some cases, the signature 960 may be generated using an asymmetric cryptographic algorithm, a post-quantum algorithm, and/or other algorithm. As non-limiting examples, the system 905 may perform an ECDSA signing operation, an RSA signing operation, or other signing operation to generate the signature 960. As shown in FIG. 9, a public key 965 associated with the system 905 may be stored in the storage device 910. The public key 965 and the private key 955 may form a private/public key pair of the system 905. In some aspects, the bitstream 915, the authentication data 945, the signature 960, and the public key 965 in the storage device 910 may correspond to the bitstream 712, the authentication data 714, the signature 716, and the public key 718, respectively, in the storage device 710 of FIG. 7. The storage device 910 may be a static storage device, such as a flash device, or an external streaming source for providing the bitstream 915, the authentication data 945, the signature 960, and the public key 965.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A method comprising:

receiving, by a system, a bitstream, a signature associated with the bitstream, predetermined authentication data associated with the bitstream, and a public key associated with a provider of the bitstream;

verifying, by the system, the signature based on the predetermined authentication data to obtain a first verification result;

computing, by the system, authentication data based on the bitstream to obtain computed authentication data;

verifying, by the system, the predetermined authentication data based on the computed authentication data to obtain a second verification result;

determining, by the system, an integrity associated with content of the bitstream to obtain at least one integrity result; and performing, by the system, one or more mitigation actions when the first verification result indicates an unsuccessful authentication, the second verification result indicates an unsuccessful authentication, and/or the at least one integrity result indicates a failed integrity check.

2. The method of claim 1, further comprising, prior to the verifying the signature and the computing, determining whether the received public key is an authorized public key based on the received public key and a version of the public key stored in and/or accessible to the system, wherein the verifying the signature and the computing are performed when the received public key is determined to be an authorized public key, and wherein the performing comprises performing the one or more mitigation actions further when the received public key is determined not to be an authorized public key.

3. The method of claim 2, wherein the determining whether the received public key is an authorized public key comprises:

comparing the received public key or a hashed version of the received public key with the version of the public key stored in and/or accessible to the system to obtain a comparison result;

determining the received public key is an authorized public key when the comparison result indicates a match; and determining the received public key is not an authorized public key when the comparison result does not indicate a match.

4. The method of claim 1, wherein the bitstream is an encrypted bitstream, wherein the method further comprises decrypting, by the system, the encrypted bitstream to obtain a decrypted bitstream, wherein the determining comprises determining the integrity associated with content of the decrypted bitstream to obtain the at least one integrity result, and wherein the verifying the signature, the computing, and the decrypting are performed in parallel.

5. The method of claim 4, wherein:

the verifying the signature, the computing, the decrypting, and the determining are performed in parallel;

the encrypted bitstream comprises a plurality of encrypted data blocks;

the decrypting comprises decrypting a first encrypted data block of the plurality of encrypted data blocks to obtain a first decrypted data block;

the determining comprises determining an integrity associated with the first decrypted data block, wherein the at least one integrity result comprises an integrity result associated with the first decrypted data block; and the performing comprises aborting the decrypting as a mitigation action of the one or more mitigation actions when the integrity result associated with the first decrypted data block indicates a failed integrity check.

6. The method of claim 5, wherein the bitstream is a configuration bitstream, wherein the method further comprises programming, by the system, a programmable logic device (PLD) based on at least a portion of the configuration bitstream, wherein:

when the integrity result associated with the first decrypted data block indicates a successful integrity check:

the programming comprises programming the PLD based on the first decrypted data block;

the decrypting further comprises decrypting a second encrypted data block of the plurality of encrypted data blocks to obtain a second decrypted data block;

the determining further comprises determining an integrity associated with the second decrypted data block, wherein the at least one integrity result further comprises an integrity result associated with the second decrypted data block; and the performing comprises aborting the decrypting as a mitigation action of the one or more mitigation actions when the integrity result associated with the second decrypted data block indicates a failed integrity check.

7. The method of claim 1, wherein the verifying the signature is further based on the public key, wherein the bitstream is a configuration bitstream, wherein the method further comprises programming, by the system, a programmable logic device (PLD) based on at least a portion of the configuration bitstream, and wherein the performing comprises causing a shutdown of the PLD as a mitigation action of the one or more mitigation actions when the first verification result indicates an unsuccessful authentication, the second verification result indicates an unsuccessful authentication, and/or the at least one integrity result indicates a failed integrity check.

8. The method of claim 7, wherein the verifying the signature comprises:

decrypting the received signature using the received public key to obtain a decrypted signature; and comparing the decrypted signature with the predetermined authentication data to obtain the first verification result.

9. The method of claim 1, wherein:

the verifying the signature, the computing, and the determining are performed in parallel;

the verifying the predetermined authentication data comprises comparing the computed authentication data with the predetermined authentication data to obtain the second verification result;

the bitstream comprises a plurality of data blocks;

the determining comprises determining an integrity associated with a first data block of the plurality of data blocks, wherein the at least one integrity result comprises an integrity result associated with the first data block; and the performing comprises performing the one or more mitigation actions when the integrity result associated with the first data block indicates a failed integrity check.

10. The method of claim 9, wherein the bitstream is a configuration bitstream, wherein the method further comprises programming, by the system, a programmable logic device (PLD) based on at least a portion of the configuration bitstream, wherein:

when the integrity result associated with the first data block indicates a successful integrity check:

the programming comprises programming the PLD based on the first data block;

the determining comprises determining an integrity associated with a second data block of the plurality of data blocks, wherein the at least one integrity result further comprises an integrity result associated with the second data block; and the performing comprises performing the one or more mitigation actions when the integrity result associated with the second data block indicates a failed integrity check.

11. The method of claim 1, wherein each of the bitstream, the signature, and the predetermined authentication data is received by the system via one or more streaming interfaces of the system and/or from one or more random access storage devices.

12. A system comprising:

an authentication block comprising:

a signature verification block configured to verify a signature received by the system based on predetermined authentication data received by the system to obtain a first verification result, wherein the signature and the predetermined authentication data are associated with a bitstream received by the system; and an authentication data verification block configured to:

compute authentication data based on the bitstream to obtain computed authentication data; and verify the predetermined authentication data based on the computed authentication data to obtain a second verification result;

an integrity block configured to determine an integrity associated with content of the bitstream to obtain at least one integrity result; and a control block configured to perform one or more mitigation actions when the first verification result indicates an unsuccessful authentication, the second verification result indicates an unsuccessful authentication, and/or the at least one integrity result indicates a failed integrity check.

13. The system of claim 12, further comprising a key verification block configured to determine whether a public key received by the system is an authorized public key based on the received public key and a version of the public key stored in and/or accessible to the system, wherein the signature verification block is configured to verify the signature when the received public key is determined to be an authorized public key, wherein the authentication data verification block is configured to compute the authentication data when the received public key is determined to be an authorized public key, wherein the control block is configured to perform the one or more mitigation actions further when the received public key is determined not to be an authorized public key.

14. The system of claim 12, wherein the bitstream is an encrypted bitstream, wherein the system further comprises:

a decryption block configured to decrypt the encrypted bitstream to obtain a decrypted bitstream, wherein the integrity block is configured to determine an integrity associated with the decrypted bitstream to obtain the at least one integrity result, and wherein the signature verification block is configured to verify the signature, the authentication data verification block is configured to compute the authentication data, and the decryption block is configured to decrypt the encrypted bitstream in parallel with each other.

15. The system of claim 14, wherein:

the signature verification block is configured to verify the signature, the authentication data verification block is configured to compute the authentication data, the decryption block is configured to decrypt the encrypted bitstream, and the integrity block is configured to determine the integrity associated with the decrypted bitstream in parallel with each other;

the encrypted bitstream comprises a plurality of encrypted data blocks;

the decryption block is configured to decrypt a first encrypted data block of the plurality of encrypted data blocks to obtain a first decrypted data block;

the integrity block is configured to determine an integrity associated with the first decrypted data block, wherein the at least one integrity result comprises an integrity result associated with the first decrypted data block; and the control block is configured to abort decryption of the encrypted bitstream as a mitigation action of the one or more mitigation actions when the integrity result associated with the first decrypted data block indicates a failed integrity check.

16. The system of claim 15, wherein the bitstream is a configuration bitstream, wherein the system further comprises a configuration block configured to program a programmable logic device (PLD) based on at least a portion of the configuration bitstream, wherein:

when the integrity result associated with the first decrypted data block indicates a successful integrity check:

the configuration block is configured to program the PLD based on the first decrypted data block;

the decryption block is configured to decrypt a second encrypted data block of the plurality of encrypted data blocks to obtain a second decrypted data block;

the integrity block is configured to determine an integrity associated with the second decrypted data block, wherein the at least one integrity result further comprises an integrity result associated with the second decrypted data block; and the control block is configured to abort decryption of the encrypted bitstream as a mitigation action of the one or more mitigation actions when the integrity result associated with the second decrypted data block indicates a failed integrity check.

17. The system of claim 12, wherein the bitstream is a configuration bitstream, wherein the system further comprises a configuration block configured to program a programmable logic device (PLD) based on at least a portion of the configuration bitstream, and wherein the control block is configured to cause a shutdown of the PLD as a mitigation action of the one or more mitigation actions when the first verification result indicates an unsuccessful authentication, the second verification result indicates an unsuccessful authentication, and/or the at least one integrity result indicates a failed integrity check.

18. The system of claim 12, wherein:

the system is configured to receive the bitstream, the signature, and the predetermined authentication data via one or more streaming interfaces of the system;

the signature verification block is configured to verify the signature by:

decrypting the received signature using the received public key to obtain a decrypted signature; and comparing the decrypted signature with the predetermined authentication data to obtain the first verification result; and the authentication data verification block is configured to verify the predetermined authentication data by comparing the computed authentication data with the predetermined authentication data to obtain the second verification result.

19. The system of claim 12, wherein:

the bitstream comprises a plurality of data blocks;

the integrity block is configured to determine an integrity associated with a first data block of the plurality of data blocks, wherein the at least one integrity result comprises an integrity result associated with the first data block; and the control block is configured to perform the one or more mitigation actions when the integrity result associated with the first data block indicates a failed integrity check.

20. The system of claim 19, wherein the bitstream is a configuration bitstream, wherein the system further comprises a configuration block configured to program a programmable logic device (PLD) based on at least a portion of the configuration bitstream, wherein:

when the integrity result associated with the first data block indicates a successful integrity check:

the configuration block is configured to program the PLD based on the first data block;

the integrity block is configured to determine an integrity associated with a second data block of the plurality of data blocks, wherein the at least one integrity result further comprises an integrity result associated with the second data block; and the control block is configured to perform the one or more mitigation actions when the integrity result associated with the second data block indicates a failed integrity check.

* * * * *